United States Patent
Hawker et al.

(10) Patent No.: US 11,280,896 B2
(45) Date of Patent: Mar. 22, 2022

(54) DOPPLER GNSS SYSTEMS AND METHODS

(71) Applicant: FLIR Belgium BVBA, Meer (BE)

(72) Inventors: Oliver Hawker, Southampton (GB);
Stephen Wilkins, Waterlooville (GB)

(73) Assignee: FLIR Belgium BVBA, Meer (BE)

( * ) Notice: Subject to any disclaimer, the term of this patent is extended or adjusted under 35 U.S.C. 154(b) by 17 days.

(21) Appl. No.: 16/412,288

(22) Filed: May 14, 2019

(65) Prior Publication Data
US 2019/0265350 A1    Aug. 29, 2019

Related U.S. Application Data

(63) Continuation-in-part of application No. PCT/US2019/017382, filed on Feb. 9, 2019, and a
(Continued)

(51) Int. Cl.
*G01S 13/86* (2006.01)
*G01C 21/20* (2006.01)
(Continued)

(52) U.S. Cl.
CPC .......... *G01S 13/862* (2013.01); *B63B 49/00* (2013.01); *G01C 21/165* (2013.01);
(Continued)

(58) Field of Classification Search
CPC ...... G01S 13/931; G01S 13/04; G01S 13/524; G01S 7/415; G01S 13/42; G01S 13/582;
(Continued)

(56) References Cited

U.S. PATENT DOCUMENTS

| | | |
|---|---|---|
| 5,075,693 A | 12/1991 | McMillan et al. |
| 5,251,139 A | 10/1993 | Takano et al. |
| | (Continued) | |

FOREIGN PATENT DOCUMENTS

| | | |
|---|---|---|
| CN | 104835353 | 8/2015 |
| CN | 107102341 A | 8/2017 |
| | (Continued) | |

OTHER PUBLICATIONS

Jennings et al., "Stereo Vision Based Mapping and Navigation for Mobile Robots", 7 pages, Department of Computer Science, University of British Columbia, Vancouver.
(Continued)

*Primary Examiner* — Olumide Ajibade Akonai
(74) *Attorney, Agent, or Firm* — Haynes and Boone, LLP

(57) ABSTRACT

Techniques are disclosed for systems and methods to provide relatively accurate position data from a plurality of separate position sensors. A system includes a logic device configured to communicate with a position sensor coupled to a mobile structure. The logic device is configured to receive positions of the position sensor and/or velocities corresponding to motion of the position sensor from the position sensor and determine an estimated relative position of the mobile structure based, at least in part, on the received Doppler-derived velocity and a prior estimated relative position of the mobile structure.

21 Claims, 9 Drawing Sheets

Related U.S. Application Data continuation-in-part of application No. 16/177,098, filed on Oct. 31, 2018, and a continuation-in-part of application No. PCT/US2018/037953, filed on Jun. 15, 2018.

(60) Provisional application No. 62/672,541, filed on May 16, 2018, provisional application No. 62/671,394, filed on May 14, 2018, provisional application No. 62/628,905, filed on Feb. 9, 2018, provisional application No. 62/584,718, filed on Nov. 10, 2017, provisional application No. 62/582,810, filed on Nov. 7, 2017, provisional application No. 62/521,346, filed on Jun. 16, 2017.

(51) Int. Cl.

| | | |
|---|---|---|
| G01C 21/16 | (2006.01) | |
| B63B 49/00 | (2006.01) | |
| G01S 15/58 | (2006.01) | |
| G01S 13/89 | (2006.01) | |
| G01S 13/58 | (2006.01) | |
| G01S 15/89 | (2006.01) | |
| G05D 1/02 | (2020.01) | |
| G01S 19/00 | (2010.01) | |

(52) U.S. Cl.
CPC .......... *G01C 21/203* (2013.01); *G01S 13/58* (2013.01); *G01S 13/89* (2013.01); *G01S 15/58* (2013.01); *G01S 15/8979* (2013.01); *G01S 19/00* (2013.01); *G05D 1/0206* (2013.01)

(58) Field of Classification Search
CPC .......... G01S 19/52; G01S 2013/93271; G01S 2013/93274; G01S 13/584; G01S 13/89; G01S 13/58; G01S 15/8979; G01S 5/02; G01S 5/0242; G01S 5/0205; G01S 5/0284; G01S 19/42; G01C 21/165; B63B 49/00; G05D 1/0206; H04W 64/00; H04W 4/02; H04W 64/003
See application file for complete search history.

(56) References Cited

U.S. PATENT DOCUMENTS

| | | | |
|---|---|---|---|
| 5,632,092 A | 5/1997 | Blank et al. | |
| 5,928,309 A | 7/1999 | Korver et al. | |
| 6,543,146 B2 | 4/2003 | Smith et al. | |
| 6,836,971 B1 | 1/2005 | Wan | |
| 7,068,815 B2 | 6/2006 | Chang et al. | |
| 7,086,164 B2 | 8/2006 | Satoh et al. | |
| 7,129,891 B2 | 10/2006 | Meunier | |
| 7,194,816 B2 | 3/2007 | Tamura | |
| 7,418,364 B1 | 8/2008 | Horton et al. | |
| 7,451,549 B1 | 11/2008 | Sodhi et al. | |
| 7,587,277 B1 | 9/2009 | Wells | |
| 7,613,581 B2 | 11/2009 | Skvortsov et al. | |
| 7,920,066 B2 | 4/2011 | Troxler | |
| 8,125,378 B1* | 2/2012 | Jarpenvaa | G01S 19/40 |
| | | | 342/357.46 |
| 8,275,544 B1 | 9/2012 | Wells et al. | |
| 8,686,900 B2 | 4/2014 | Whitehead et al. | |
| 9,513,376 B1 | 12/2016 | Heinrich et al. | |
| 2004/0123474 A1 | 7/2004 | Manfred et al. | |
| 2005/0099887 A1 | 5/2005 | Zimmerman et al. | |
| 2005/0125141 A1 | 6/2005 | Bye | |
| 2005/0075016 A1 | 7/2005 | Bertetti et al. | |
| 2007/0120733 A1 | 5/2007 | Vollath et al. | |
| 2008/0052933 A1 | 3/2008 | Yamada | |
| 2008/0066331 A1 | 3/2008 | Brzezinski et al. | |
| 2009/0254294 A1 | 10/2009 | Dutta | |
| 2009/0292495 A1 | 11/2009 | Navarro, Jr. et al. | |
| 2010/0079334 A1 | 4/2010 | Roh et al. | |
| 2011/0077889 A1 | 3/2011 | Vogt | |
| 2011/0199260 A1* | 8/2011 | Garrett | G01S 5/0242 |
| | | | 342/357.35 |
| 2011/0241656 A1 | 10/2011 | Piemonte et al. | |
| 2011/0304737 A1 | 12/2011 | Evans et al. | |
| 2012/0098700 A1 | 4/2012 | van Diggelen | |
| 2012/0130570 A1* | 5/2012 | Pease | B63H 25/04 |
| | | | 701/21 |
| 2014/0020445 A1 | 1/2014 | Waters et al. | |
| 2015/0089427 A1 | 3/2015 | Akuzawa | |
| 2015/0312719 A1* | 10/2015 | Cho | G01S 5/0263 |
| | | | 455/456.5 |
| 2016/0187883 A1 | 6/2016 | Tyers et al. | |
| 2016/0214534 A1 | 7/2016 | Richards et al. | |
| 2018/0028154 A1* | 2/2018 | Zhai | A61B 8/5207 |
| 2018/0203094 A1* | 7/2018 | Gudim | G01S 5/04 |

FOREIGN PATENT DOCUMENTS

| | | |
|---|---|---|
| DE | 4328573 | 3/1995 |
| EP | 2622369 | 8/2015 |
| JP | 2010-112759 | 5/2010 |
| JP | 2016-057131 | 4/2016 |
| JP | 2017106842 | 6/2017 |
| WO | WO 99/053635 | 10/1999 |
| WO | WO 2004/048995 | 6/2004 |
| WO | WO 2006/098666 | 9/2006 |
| WO | WO 2010/108938 | 9/2010 |
| WO | WO 2011/069266 | 6/2011 |
| WO | WO 2012/044964 | 4/2012 |
| WO | WO 2014/043824 | 3/2014 |
| WO | WO 2014/165365 | 10/2014 |
| WO | WO 2016/042545 | 3/2016 |

OTHER PUBLICATIONS

He et al., "On the Integrated Calibration of a Digital Stereo Vision System", 7 pages, Department of Geodetic Science and Surveying, Center for Mapping, The Ohio State University Commission V.
He et al., "Stereo Camera System Calibration with Relative Orientation Constraints", Proceedings of the SPIE, Videometrics 1992, Applications in Optical Science and Engineering, Feb. 24, 1993, 8 pages, vol. 1820.
Bevly et al., "Integrating INS Sensors with GPS Measurements for Continuous Estimation of Vehicle Sideslip, Roll, and Tire Cornering Stiffness", IEEE Transactions on Intelligent Transportation Systems, Dec. 2006, 11 pages, vol. 7, No. 4.
"Beam steering," Wikipedia, [online], 2 pages, [retrieved on 2019.0.19], Retrieved from the Internet: , <https://en.wikipedia.org/wiki/Beam_steering>.
Ryu et al., "Integrating Inertial Sensors with GPS for Vehicle Dynamics Control", 26 pages, Jun. 2004, Journal of Dynamic Systems, Measurement, and Control, Department of Mechanical Engineering, Design Division, Stanford University.
Schrader, Daniel Kenneth, "Combining Multiple, Inexpensive GPS Receivers to Increase Accuracy and Reliability," Open Access Theses, May 2013, 76 Pages.

* cited by examiner

DOPPLER GNSS SYSTEMS AND METHODS

This application claims priority to and the benefit of U.S. Provisional Patent Application No. 62/672,541 filed May 16, 2018 and entitled "DOPPLER GNSS SYSTEMS AND METHODS," which is incorporated herein by reference in its entirety.

This application also claims priority to and the benefit of U.S. Provisional Patent Application No. 62/671,394 filed May 14, 2018 and entitled "AUTOPILOT INTERFACE SYSTEMS AND METHODS," which is incorporated herein by reference in its entirety.

This application is a continuation-in-part of International Patent Application No. PCT/US2019/017382 filed Feb. 9, 2019 and entitled "AUTOPILOT INTERFACE SYSTEMS AND METHODS," which is incorporated herein by reference in its entirety.

International Patent Application No. PCT/US2019/017382 filed Feb. 9, 2019 claims priority to and the benefit of U.S. Provisional Patent Application No. 62/671,394 filed May 14, 2018 and entitled "AUTOPILOT INTERFACE SYSTEMS AND METHODS," and U.S. Provisional Patent Application No. 62/628,905 filed Feb. 9, 2018 and entitled "AUTONOMOUS AND ASSISTED DOCKING SYSTEMS AND METHODS," which are both incorporated herein by reference in their entirety.

This application is also a continuation-in-part of International Patent Application No. PCT/US2018/037953 filed Jun. 15, 2018 and entitled "AUTONOMOUS AND ASSISTED DOCKING SYSTEMS AND METHODS," which is incorporated herein by reference in its entirety.

International Patent Application No. PCT/US2018/037953 filed Jun. 15, 2018 claims priority to and the benefit of U.S. Provisional Patent Application No. 62/521,346 filed Jun. 16, 2017 and entitled "AUTONOMOUS AND ASSISTED DOCKING SYSTEMS AND METHODS," U.S. Provisional Patent Application No. 62/584,718 filed Nov. 10, 2017 and entitled "AUTONOMOUS AND ASSISTED DOCKING SYSTEMS AND METHODS," and U.S. Provisional Patent Application No. 62/628,905 filed Feb. 9, 2018 and entitled "AUTONOMOUS AND ASSISTED DOCKING SYSTEMS AND METHODS, which are all incorporated herein by reference in their entirety.

This application is also related to International Patent Application No. PCT/US2018/037954 filed Jun. 15, 2018 and entitled "PERIMETER RANGING SENSOR SYSTEMS AND METHODS," which is incorporated herein by reference in its entirety.

International Patent Application No. PCT/US2018/037954 filed Jun. 15, 2018 claims priority to and the benefit of U.S. Provisional Patent Application No. 62/521,346 filed Jun. 16, 2017 and entitled "AUTONOMOUS AND ASSISTED DOCKING SYSTEMS AND METHODS," U.S. Provisional Patent Application No. 62/584,718 filed Nov. 10, 2017 and entitled "AUTONOMOUS AND ASSISTED DOCKING SYSTEMS AND METHODS," and U.S. Provisional Patent Application No. 62/628,905 filed Feb. 9, 2018 and entitled "AUTONOMOUS AND ASSISTED DOCKING SYSTEMS AND METHODS, which are all incorporated herein by reference in their entirety.

This application is also a continuation-in-part of U.S. patent application Ser. No. 16/177,098 filed Oct. 31, 2018 and entitled "LOW COST HIGH PRECISION GNSS SYSTEMS AND METHODS," which claims priority to and the benefit of U.S. Provisional Patent Application 62/582,810 filed Nov. 7, 2017 and entitled "LOW COST HIGH PRECISION GNSS SYSTEMS AND METHODS," which is incorporated herein by reference in its entirety.

This application is also related to U.S. patent application Ser. No. 15/445,717 filed Feb. 28, 2017 and entitled "ROTATING ATTITUDE HEADING REFERENCE SYSTEMS AND METHODS," which is a continuation of International Patent Application No. PCT/US2015/047991 filed Sep. 1, 2015 and entitled "ROTATING ATTITUDE HEADING REFERENCE SYSTEMS AND METHODS," which are incorporated herein by reference in their entirety.

International Patent Application No. PCT/US2015/047991 claims priority to and the benefit of U.S. Provisional Patent Application No. 62/212,955 filed Sep. 1, 2015 and entitled "ROTATING ATTITUDE HEADING REFERENCE SYSTEMS AND METHODS," U.S. Provisional Patent Application No. 62/099,090 filed Dec. 31, 2014 and entitled "ROTATING ATTITUDE HEADING REFERENCE SYSTEMS AND METHODS," and U.S. Provisional Patent Application No. 62/044,911 filed Sep. 2, 2014 and entitled "REMOTE SENSING WITH INTEGRATED ORIENTATION AND POSITION SENSORS SYSTEMS AND METHODS," which are hereby incorporated by reference in their entirety.

U.S. patent application Ser. No. 15/445,717 is also a continuation-in-part of U.S. patent application Ser. No. 14/941,497 filed Nov. 13, 2015 and entitled "AUTOMATIC COMPASS CALIBRATION SYSTEMS AND METHODS," which is a continuation of International Patent Application No. PCT/US2014/038286 filed May 15, 2014 and entitled "AUTOMATIC COMPASS CALIBRATION SYSTEMS AND METHODS," which are hereby incorporated by reference in their entirety.

International Patent Application No. PCT/US2014/038286 claims priority to and the benefit of U.S. Provisional Patent Application No. 61/823,903 filed May 15, 2013 and entitled "AUTOMATIC COMPASS CALIBRATION SYSTEMS AND METHODS" and U.S. Provisional Patent Application No. 61/823,906 filed May 15, 2013 and entitled "AUTOMATIC COMPASS CALIBRATION SYSTEMS AND METHODS," which are all incorporated herein by reference in their entirety.

TECHNICAL FIELD

One or more embodiments of the invention relate generally to position sensing systems and more particularly, for example, to systems and methods for providing absolute positions using multiple global navigation satellite systems.

BACKGROUND

Remote sensing systems, such as radar, sonar, LIDAR, and/or other ranging sensory systems, are often used to assist in navigation by producing data and/or imagery of the environment surrounding a mobile structure, such as imagery representing above-surface and/or subsurface features critical to navigation of a watercraft over a body of water. Conventional remote sensing systems often include a display configured to provide traditionally recognizable remote sensing imagery to a user.

Remote sensing imagery, and particularly imagery comprising aggregations of remote sensor returns received over time, is typically subject to a variety of measurement errors that reduce the reliability of the imagery. In particular, noise and/or inaccuracies in the measurement of the position of the mobile structure to which the remote sensing systems are coupled can increase the risk of a user misinterpreting the imagery (e.g., relative ranges, depths, sizes, and other critical distances reflected in the imagery). At the same time, consumer market pressures and convenience dictate easier to use systems that are inexpensive and that produce high quality resulting imagery and/or reliable autopiloted navigation of the mobile structure. Thus, there is a need for an improved methodology to provide highly accurate and reliable position measurements of the position of a mobile structure using relatively inexpensive position sensors, particularly in the context of using such measured positions to navigate or autopilot the mobile structure.

SUMMARY

Techniques are disclosed for systems and methods to provide relatively accurate position data from a plurality of separate position sensors located about a mobile structure. A system includes a logic device configured to communicate with position sensors coupled to the mobile structure at different locations. The logic device is configured to receive position data from the position sensors corresponding to a position of the mobile structure from the position sensors, determine weighting factors corresponding to the received position data, and determine a measured position for the mobile structure based, at least in part, on the received position data and the determined weighting factors. A position measurement system may include radar sensor assemblies, sonar sensor assemblies, other remote sensing assemblies, and logic devices in communication with the various assemblies. Each remote sensing assembly may be adapted to be mounted to a mobile structure and/or placed in a body of water, and each remote sensing imagery system may include a separate position sensor. The logic devices may be configured to receive sensor data and generate imagery based on the sensor data. Subsequent user input and/or the sensor data may be used to adjust a steering actuator, a propulsion system thrust, and/or other operational systems of the mobile structure.

In various embodiments, a position measurement system may include one or more orientation sensors, position sensors, gyroscopes, accelerometers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a position sensor coupled to a mobile structure and configured to provide a Doppler-derived velocity corresponding to motion of the position sensor; and a logic device configured to communicate with the position sensor, wherein the logic device is configured to: receive the Doppler-derived velocity from the position sensor; and determine an estimated relative position of the mobile structure based, at least in part, on the received Doppler-derived velocity and a prior estimated relative position of the mobile structure.

In another embodiment, a system may include a position sensor coupled to a mobile structure and configured to provide an absolute position of the position sensor; an orientation sensor coupled to the mobile structure and configured to provide an absolute orientation of the mobile structure; and a logic device configured to communicate with the position sensor and the orientation sensor, wherein the logic device is configured to: receive the absolute orientation of the mobile structure from the orientation sensor and the absolute position of the position sensor from the position sensor; determine a transformation matrix based, at least in part, on the received absolute orientation of the mobile structure; determine an absolute position offset associated with the position sensor based, at least in part, on the received absolute orientation of the mobile structure, the determined transformation matrix, and a relative position vector from a center of mass of the mobile structure to a mounting position of the position sensor on the mobile structure; and determine an estimated absolute position of the mobile structure based, at least in part, on the absolute position received from the position sensor and the determined absolute position offset.

In another embodiment, a system may include a position sensor coupled to a mobile structure and configured to provide a time series of absolute linear velocities corresponding to motion of the position sensor; an orientation sensor coupled to the mobile structure and configured to provide a time series of angular velocities of the mobile structure; and a logic device configured to communicate with the position sensor and the orientation sensor, wherein the logic device is configured to: receive the absolute linear velocities of the position sensor from the position sensor and the angular velocities of the mobile structure from the orientation sensor; and determine an estimated linear velocity of the mobile structure based, at least in part, on the received absolute linear velocities of the position sensor and the received angular velocities of the mobile structure.

In another embodiment, a system may include an orientation sensor coupled to a mobile structure and configured to provide absolute orientations of the mobile structure; a spatial measurement sensor coupled to the mobile structure and configured to provide spatial data corresponding to an environment about mobile structure 101; and a logic device configured to communicate with the orientation sensor and the spatial measurement sensor, wherein the logic device is configured to: receive the absolute orientations of the mobile structure from the orientation sensor and the spatial data from the spatial measurement sensor; determine a set of relative orientations of a water plane represented within the spatial data corresponding to a set of measurement times, relative to a sensor orientation corresponding to the spatial measurement sensor; identify a set of absolute orientations of the mobile structure corresponding to the set of measurement times based, at least in part, on the received absolute orientations of the mobile structure; and determine a relative sensor orientation corresponding to the spatial measurement sensor, relative to the orientation sensor, based, at least in part, on the determined set of relative orientations of the water plane, the identified set of absolute orientations of the mobile structure, and a known absolute orientation of the water plane.

In another embodiment, a method may include receiving a Doppler-derived velocity corresponding to motion of a position sensor coupled to a mobile structure; and determining an estimated relative position of the mobile structure based, at least in part, on the received Doppler-derived velocity and a prior estimated relative position of the mobile structure.

In another embodiment, a method may include receiving an absolute orientation of a mobile structure from an orientation sensor coupled to the mobile structure and an absolute position of a position sensor coupled to a mobile structure; determining a transformation matrix based, at least in part, on the received absolute orientation of the mobile structure; determining an absolute position offset associated with the position sensor based, at least in part, on the received absolute orientation of the mobile structure, the determined transformation matrix, and a relative position vector from a center of mass of the mobile structure to a mounting position of the position sensor on the mobile structure; and determining an estimated absolute position of the mobile structure based, at least in part, on the absolute position received from the position sensor and the determined absolute position offset.

In another embodiment, a method may include receiving absolute linear velocities of a position sensor coupled to a mobile structure and angular velocities of the mobile structure from an orientation sensor coupled to the mobile structure; and determining an estimated linear velocity of the mobile structure based, at least in part, on the received absolute linear velocities of the position sensor and the received angular velocities of the mobile structure.

In another embodiment, a method may include receiving absolute orientations of a mobile structure from an orientation sensor coupled to the mobile structure and spatial data from a spatial measurement sensor coupled to the mobile structure; determining a set of relative orientations of a water plane represented within the spatial data corresponding to a set of measurement times, relative to a sensor orientation corresponding to the spatial measurement sensor; identifying a set of absolute orientations of the mobile structure corresponding to the set of measurement times based, at least in part, on the received absolute orientations of the mobile structure; and determining a relative sensor orientation corresponding to the spatial measurement sensor, relative to the orientation sensor, based, at least in part, on the determined set of relative orientations of the water plane, the identified set of absolute orientations of the mobile structure, and a known absolute orientation of the water plane.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
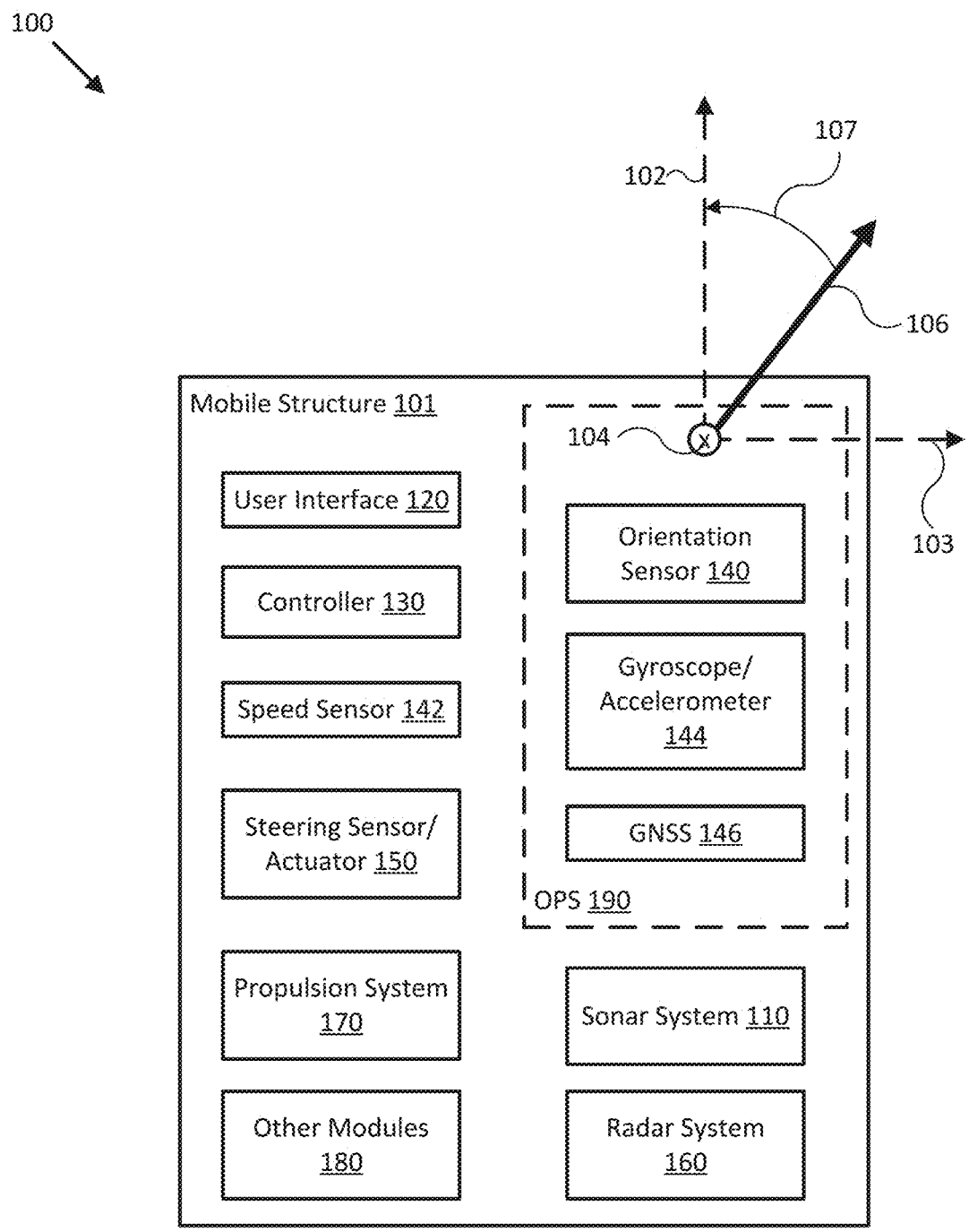
FIG. 1A illustrates a block diagram of a position measurement system in accordance with an embodiment of the disclosure.

In accordance with various embodiments of the present disclosure, a measured position of a mobile structure may be provided by a position measurement system including a plurality of position sensors distributed across the mobile structure. Each position sensor may provide separate position data that may be combined to generate a relatively reliable and accurate measured position of the mobile structure. Such system may also include one or more remote sensing assemblies, orientation sensors, gyroscopes, accelerometers, additional position sensors, and/or speed sensors providing measurements of an orientation, a position, an acceleration, and/or a speed of the remote sensing assemblies and/or a coupled mobile structure. For example, the various sensors may be mounted to or within the mobile structure (e.g., a watercraft, aircraft, motor vehicle, and/or other mobile structure), or may be integrated with the remote sensing assemblies, as described herein. Embodiments of the present disclosure produce measured positions of a coupled mobile structure that can be used to generate remote sensing imagery that is less prone to noise jitter and drift and is thereby more reliable and easier to interpret by consumers than conventional systems and/or methods. Such measured positions and remote sensor data may also be combined to provide reliable navigation or autopiloting for the mobile structure, as described herein.

Generally available position sensors (e.g., GPS, GLONASS, Galileo, COMPASS, IRNSS, and/or other global navigation satellite system (GNSS) receivers) often suffer from noise and error, which manifests itself as an inaccurate position measurement or series of position measurements. Conventional systems are available that include a relatively large number of GNSS antennae (rather than full receivers), but such single-receiver systems are relatively large, complex, and expensive. By contrast, embodiments of the present disclosure employ a network of inexpensive and typically compact GNSS receivers and combines their individual position data outputs to reduce such noise and error significantly. For example, in some embodiments, a position measurement system according to the present disclosure may be configured to combine the position data outputs of multiple position sensors/GNSS receivers according to weighting factors derived from "fix metadata" provided by each position sensor, where more reliable position sensors, as determined by the fix metadata, are "trusted" more than less reliable position sensors. In related embodiments, various extrinsic position data reliability metrics (e.g., derived from a time series of position data provided by the position sensors, and/or from other sensor data) and may be used to determine and/or refine such weighting factors.

Embodiments of the present disclosure employ standalone position sensors/GNSS receivers (and not simply additional separate antennae) in order to ease implementation, increase scalability, and decrease cost (e.g., embodiments can be implemented using relatively inexpensive "off the shelf" hardware, which can more easily be integrated with other systems of the mobile structure, as described herein). In some embodiments, a such network of position sensors can be configured to provide position measurements at a higher output rate than any individual position sensor is capable of, thereby providing more rapid and precise position updates for time sensitive applications, such as high-speed marine navigation.

In various embodiments, the output from multiple position sensors/GNSS receivers can be combined using a weighted average, where the weight is a function of corresponding fix metadata such as position dilution-of-precision, time dilution-of-precision, standard deviation, and/or other fix metadata provided by the individual position sensors, in order to "trust" more reliable GNSS receivers (e.g., as indicated by the fix metadata). For example, a mobile structure with one standalone GNSS and two multi-function displays/user interfaces with built-in position sensors/GNSS receivers will have three separate sources of position data on a shared network (e.g., a CAN bus). A logic device may be configured to receive position data, including corresponding fix metadata, from all three position sensors, and to determine a measured position of the mobile structure by combining the positions provided by each position sensor according to weighting factors implemented as functions of the fix metadata, as described above. The logic device may be configured to use this improved measured position to drive an autopilot, plot a position on a chart, align a radar overlay, or for any other use of GNSS positioning with greater accuracy.

Shown below is a simplified worked example of determining weighting factors from fix metadata and determining a corresponding measured position. While the pseudocode is presented as processing measurements in units of meters, similar processing could be performed on measurements and fix metadata provided according to latitude, longitude, and altitude, and/or other absolute and/or relative position measurement units, as described herein. One embodiment of example pseudocode with example data is as follows:
Input data for three GNSS receivers [r1 r2 r3]
GPSX=[1 1.4 1.1]; GPSY=[2 2 2.5]; GPSZ=[−1 0 0.5];
Fix metadata for three GNSS receivers [r1 r2 r3]
HDOP=[0.5 3 2.5]; % Horizontal dilution of precision
VDOP=[6.4 2 5]; % Vertical dilution of precision
% Measured position=sum(position*normalized weighting factor)
GPSOut(1)=sum(GPSX.*HDOP)/sum(HDOP);
GPSOut (2)=sum(GPSY.*VDOP)/sum(VDOP);
GPSOut(3)=sum(GPSZ.*HDOP)/sum(HDOP);
% Calculated measured position
Output: GPSOut=1.2417 2.1866 0.1250

As described and shown herein, GPSOut (e.g. the measured position of the mobile structure) is statistically more likely to be the actual position than any position reported by any individual position sensor in the position measurement system.

Noise and errors in the measurements of position sensors/GNSS receivers is not always Gaussian; often such data includes a discrete event where a position sensor will provide very inaccurate but persistent position data, referred to herein as a position data excursion event, which can last for many seconds or minutes of position data in a time series of position data. Embodiments of the present disclosure may be configured to detect such position data excursion events by, for example, comparing the weighted outputs of each position sensor/GNSS receiver to each other, thereby allowing such erroneous position data to be identified and excluded from the position measurement determination in order to provide an accurate measurement position until the event has passed.

In additional embodiments, a position measurement system according to the present disclosure may be configured to synthesize a time series of measured positions at a higher update rate than any one of the constituent standalone position sensors/GNSS receivers. For example, the internal measurement clocks of the individual position sensors may be set so as to be out of phase, such that their individual measurements can be made at different times. Given the opportunity to modify the target measurement phase of each position sensor, a phase-shift of each position sensor's clock could be auto-negotiated to stagger position sensor measurements in order to create a more continuous stream of data.

Including orientation and/or position sensors (OPSs) within a remote sensing assembly reduces or eliminates timing errors due to non-synchronicity of the data from the sensing element and data sent from an external sensor over a network. The reduced error allows a helmsman to rely on distances and relative bearings to a coastline or structure on a seafloor or fish in the water, for example, and the increased accuracy facilitates a number of operational modes, such as closing or avoiding a target, overlaying remote imagery on a chart, tracking other vessels, relating targets to automatic identification system (AIS) information, and/or other operational modes. In addition, an embedded OPS can be implemented at reduced cost as the various types of orientation and position sensors constituting the OPS can share power supplies, processing devices, interfaces, and the enclosure/housing of the associated remote sensing system. Installing separate and external orientation/position sensors/housings requires separate cables and additional installation time.

In some embodiments, a position measurement system according to the present disclosure may include a remote sensing system with an OPS configured to provide orientation data and position data. In such embodiments, the remote sensing imagery system may be configured to determine the track, course over ground (COG), and/or speed over ground (SOG) of the remote sensing system and/or the coupled mobile structure from the position data provided by the OPS. Corresponding headings (e.g., referenced to True North, for example) may be determined from the track, COG, and/or SOG, and the effects of wind and tide can be estimated and displayed or removed from the heading. Set (e.g., due to tide) and leeway (e.g., due to wind) errors may not need to be compensated for because the data provided by the OPS can be referenced to an absolute coordinate frame.

FIG. 1A illustrates a block diagram of position measurement system 100 in accordance with an embodiment of the disclosure. In various embodiments, system 100 may be adapted to measure an orientation, a position, an acceleration, and/or a speed of sonar system 110, radar system 160, user interface 120, and/or mobile structure 101 using any of the various sensors of orientation and/or position sensor (OPS) 190 and/or mobile structure 101. System 100 may then use these measurements to generate accurate image data from sonar data provided by sonar system 110 and/or radar data provided by radar system 160 according to a desired operation of system 100 and/or mobile structure 101. In some embodiments, system 100 may display resulting imagery to a user through user interface 120, and/or use the sonar data, radar data, orientation and/or sensor data, and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide orientation and/or position data for a particular type of mobile structure 101, such as a drone, a watercraft, an aircraft, a robot, a vehicle, and/or other types of mobile structures, including any platform designed to move through or under the water, through the air, and/or on a terrestrial surface. In one embodiment, system 100 may include one or more of a sonar system 110, a radar system 160, a user interface 120, a controller 130, an OPS 190 (e.g., including an orientation sensor 140, a gyroscope/accelerometer 144, and/or a global navigation satellite system (GNSS) 146), a speed sensor 142, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or other module of sonar system 110, OPS 190, orientation sensor 140, and/or user interface 120, for example) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements (e.g., remote sensing system arrangements) that can be used to detect objects within a water column and/or a floor of a body of water.

More generally, sonar system 110 may be configured to emit one, multiple, or a series of acoustic beams (e.g., remote sensor beams), receive corresponding acoustic returns (e.g., remote sensor returns), and convert the acoustic returns into sonar data and/or imagery (e.g., remote sensor image data), such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide relatively accurate and/or distortion free underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with its own dedicated OPS 190, which may include various orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar sensor assembly, an actuator, a transducer module, and/or other components of sonar system 110. For example, OPS 190 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

Radar system 160 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies/sensor assemblies, assembly brackets, mast brackets, and/or various actuators adapted to adjust orientations of any of the components of radar system 160, as described herein. For example, in various embodiments, radar system 160 may be implemented according to various radar system arrangements (e.g., remote sensing system arrangements) that can be used to detect features of and objects on or above a terrestrial surface or a surface of a body of water.

More generally, radar system 160 may be configured to emit one, multiple, or a series of radar beams (e.g., remote sensor beams), receive corresponding radar returns (e.g., remote sensor returns), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other objects reflecting the radar beams back at radar system 160. Sonar system 110 may be configured to provide such data and/or imagery to user interface 120 for display to a user, for example, or to controller 130 for additional processing, as described herein. Moreover, such data may be used to generate one or more charts corresponding to AIS data, ARPA data, MARPA data, and or one or more other target tracking and/or identification protocols.

In some embodiments, radar system 160 may be implemented using a compact design, where multiple radar antennas, sensors, and/or associated processing devices are located within a single radar sensor assembly housing that is configured to interface with the rest of system 100 through a single cable providing both power and communications to and from radar system 160. In some embodiments, radar system 160 may include orientation and/or position sensors (e.g., OPS 190) configured to help provide two or three dimensional waypoints, increase radar data and/or imagery quality, and/or provide highly accurate radar image data, as described herein.

For example, fisherman desire highly detailed and accurate information and/or imagery of local and remote structures and other watercraft. Conventional radar systems can be expensive and bulky and typically cannot be used to provide relatively accurate and/or distortion free radar image data, as described herein. Embodiments of radar system 160 include low cost single, dual, and/or multichannel (e.g., synthetic aperture) radar systems that can be configured to produce detailed two and three dimensional radar data and/or imagery. In some embodiments, radar system 160 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, radar system 160 may be implemented with its own dedicated OPS 190, which may include various orientation and/or position sensors (e.g., similar to orientation sensor 140, gyroscope/accelerometer 144, and/or GNSS 146) that may be incorporated within the radar sensor assembly housing to provide three dimensional orientations and/or positions of the radar sensor assembly and/or antenna(s) for use when processing or post processing radar data for display. The sensor information can be used to correct for movement of the radar sensor assembly between beam emissions to provide improved alignment of corresponding radar returns/samples, for example, and/or to generate imagery based on the measured orientations and/or positions of the radar sensor assembly/antenna. In other embodiments, an external orientation and/or position sensor can be used alone or in combination with an integrated sensor or sensors.

In embodiments where radar system 160 is implemented with a position sensor, radar system 160 may be configured to provide a variety of radar data and/or imagery enhancements. For example, radar system 160 may be configured to provide accurate positioning of radar data and/or user-defined waypoints remote from mobile system 101. Similarly, radar system 160 may be configured to provide accurate two and/or three dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, radar system 160 may be configured to generate accurate and detailed intensity plots of objects on a surface of a body of water without access to a magnetometer.

In embodiments where radar system 160 is implemented with an orientation and/or position sensor, radar system 160 may be configured to store such location/position information along with other sensor information (radar returns, temperature measurements, text descriptions, altitude, mobile structure speed, and/or other sensor and/or control information) available to system 100. In some embodiments, controller 130 may be configured to generate a look up table so that a user can select desired configurations of radar system 160 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of radar system 160, and controller 130 may be configured to control an actuator and/or otherwise implement the configuration for radar system 160 (e.g., to set a particular orientation or rotation rate). In still another embodiment, controller 130 may be configured to receive orientation measurements for mobile structure 101. In such embodiment, controller 130 may be configured to control the actuators associated with the radar sensor assembly to maintain its orientation relative to, for example, the mobile structure and/or the water surface, and thus improve the displayed sonar images (e.g., by ensuring consistently oriented radar beams and/or proper registration of a series of radar returns). In various embodiments, controller 130 may be configured to control steering sensor/actuator 150 and/or propulsion system 170 to adjust a position and/or orientation of mobile structure 101 to help ensure proper registration of a series of radar returns, radar data, and/or radar imagery.

Although FIG. 1A shows various sensors and/or other components of system 100 separate from radar system 160, in other embodiments, any one or combination of sensors and components of system 100 may be integrated with a radar sensor assembly, an actuator, a transducer module, and/or other components of radar system 160. For example, OPS 190 may be integrated with an antenna platform of sonar system 110 and be configured to provide measurements of an absolute and/or relative orientation (e.g., a roll, pitch, and/or yaw) of the antenna to controller 130 and/or user interface 120, both of which may also be integrated with radar system 160.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of sonar system 110, radar system 160, and/or mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, or an antenna or radar sensor assembly of radar system 160) overlaid on a geographical map, which may include one or more graphs indicating a corresponding time series of actuator control signals, sensor information, and/or other sensor and/or control signals, including sonar and/or radar image data.

In some embodiments, user interface 120 may be adapted to accept user input including a user-defined target heading, route (e.g., track for radar system 160), and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude/ absolute angular frequency for an actuated device (e.g., sonar system 110, radar system 160) coupled to mobile structure 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing.

In various embodiments, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101. For example, in one embodiment, user interface 120 may include an embodiment of OPS 190 and/or one or more elements of OPS 190, including an embodiment of GNSS 146.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, radar system 160, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, radar system 160, mobile structure 101, and/or system 100.

OPS 190 may be implemented as an integrated selection of orientation and/or position sensors (e.g., orientation sensor 140, accelerometer/gyroscope 144, GNSS 146) that is configured to provide orientation and/or position data in relation to one or more elements of system 100. For example, embodiments of OPS 190 may be integrated with mobile structure 101, sonar system 110, and/or radar system 160 and be configured to provide orientation and/or position data corresponding to a center of mass of mobile structure 101, a sonar transducer of sonar system 110, and/or a radar antenna of radar system 160. Such measurements may be referenced to an absolute coordinate frame, for example, or may be referenced to a coordinate frame of OPS 190 and/or any one of the individual sensors integrated with OPS 190.

More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100. In various embodiments, system 100 may include multiple embodiments of OPS 190 and/or elements of OPS 190, including multiple embodiments of GNSS 146, which may be coupled to mobile structure 101 at different locations.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example. In various embodiments, orientation sensor 140 may be implemented and/or operated according to any of the systems and methods described in International Application PCT/US14/38286 filed May 15, 2014 and entitled "AUTOMATIC COMPASS CALIBRATION SYSTEMS AND METHODS", which is hereby incorporated by reference in its entirety.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global navigation satellite system receiver and/or other device capable of determining absolute and/or relative position of mobile structure 101 (e.g., or an element of mobile structure 101, such as sonar system 110 radar system 160, and/or user interface 120) based on wireless signals received from space-born and/or terrestrial sources, for example, and capable of providing such measurements as sensor signals that may be communicated to various devices of system 100. More generally, GNSS 146 may be implemented to any one or combination of a number of different GNSSs. In some embodiments, GNSS 146 may be used to determine a velocity, speed, COG, SOG, track, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. In various embodiments, system 100 may include multiple embodiments of GNSS 146 (e.g., position sensors 146) each coupled to mobile structure 101 at different locations and/or integrated with different elements of system 100, as described herein.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In other embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). Other modules 180 may include a sensing element angle sensor, for example, which may be physically coupled to a radar sensor assembly housing of radar system 160 and be configured to measure an angle between an orientation of an antenna/sensing element and a longitudinal axis of the housing and/or mobile structure 101. Other modules 180 may also include a rotating antenna platform and/or corresponding platform actuator for radar system 160. In some embodiments, other modules 180 may include one or more Helmholtz coils integrated with OPS 190, for example, and be configured to selectively cancel out one or more components of the Earth's magnetic field.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, radar system 160, and/or other sensors of system 100 to/from a coordinate frame of orientation sensor 140 and/or mobile structure 101, for example. Furthermore, such parameters may be used to determine and/or calculate one or more adjustments to an orientation of sonar system 110 and/or radar system 160 that would be necessary to physically align a coordinate frame of sonar system 110 and/or radar system 160 with a coordinate frame of orientation sensor 140 and/or mobile structure 101, for example, or an absolute coordinate frame. Adjustments determined from such parameters may be used to selectively power adjustment servos/actuators (e.g., of sonar system 110, radar system 160, and/or other sensors or elements of system 100), for example, or may be communicated to a user through user interface 120, as described herein.

Figure 1B:
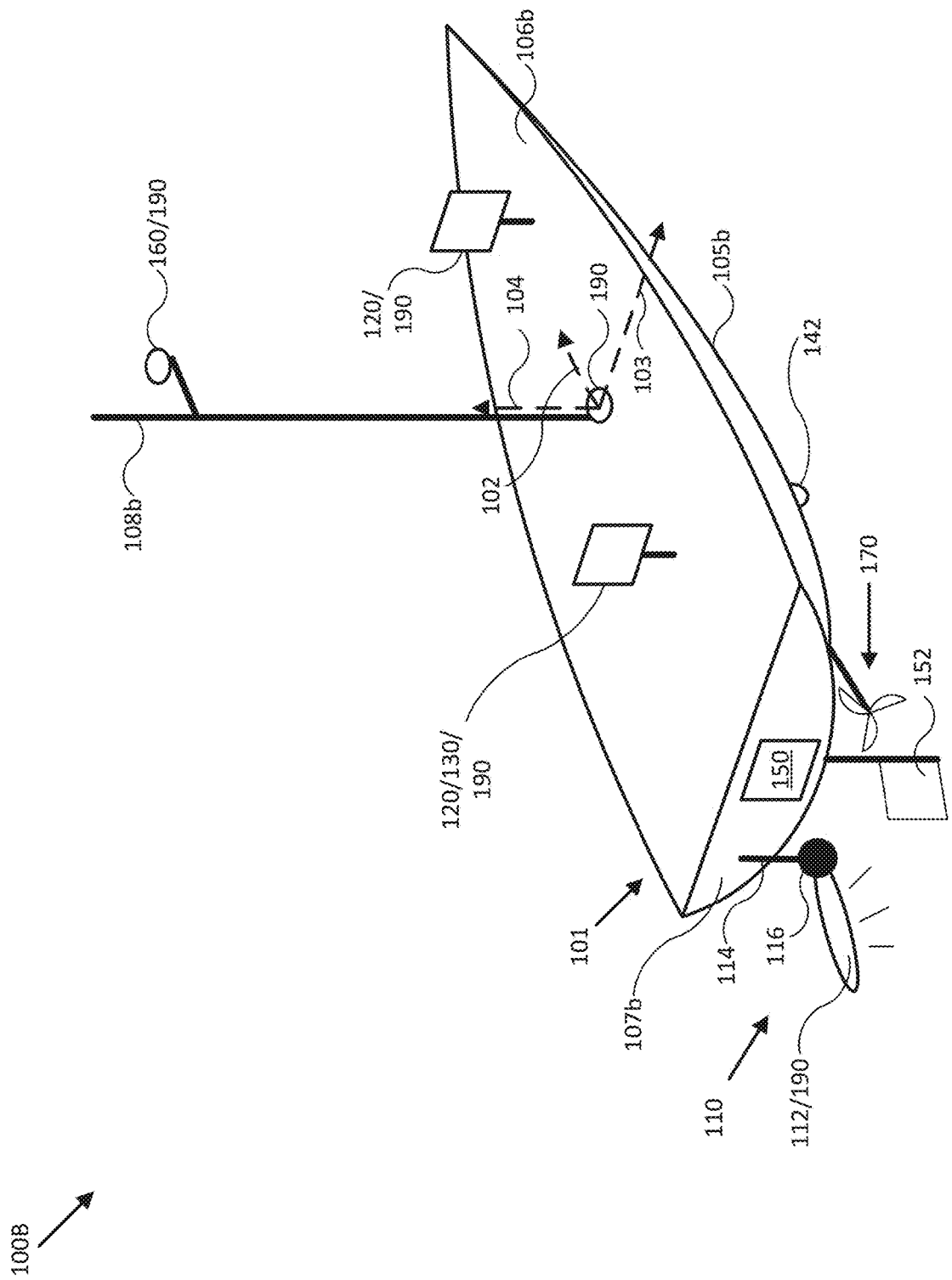
FIG. 1B illustrates a diagram of a position measurement system in accordance with an embodiment of the disclosure.

FIG. 1B illustrates a diagram of system 100B in accordance with an embodiment of the disclosure. In the embodiment shown in FIG. 1B, system 100B may be implemented to provide position measurements of mobile structure 101 for use with operation of mobile structure 101, similar to system 100 of FIG. 1A. For example, system 100B may include sonar system/OPS 110/190, radar system/OPS 160/190, integrated user interface/controller/OPS 120/130/190, secondary user interface/OPS 120/190, steering sensor/actuator 150, sensor cluster/OPS 190 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, radar system/OPS 160/190 coupled to mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes OPS 190 integrated with transducer assembly 112, which are coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller/OPS 120/130/190. For example, user interface/controller/OPS 120/130/190 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller/OPS 120/130/190 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

Also shown in FIG. 1B is radar system 160, which includes integrated OPS 190 and a radar antenna platform and actuator configured to rotate the radar antenna about a vertical axis substantially aligned with vertical axis 104 of mobile structure 101. In some embodiments, user interface/controller/OPS 120/130/190 may be configured to receive radar returns from a radar sensor assembly of radar system/OPS 160/190, and corresponding orientation and/or position data from radar system/OPS 160/190 (e.g., corresponding to an orientation and/or position of an antenna of radar system 160 when the radar returns are received), and then generate radar image data based, at least in part, on the radar returns and the corresponding orientation and/or position data.

More generally, both sonar system 110 and radar system 160 are types of remote sensing systems, each with remote sensing assemblies (e.g., sonar sensor assemblies, radar sensor assemblies) including housings adapted to be mounted to mobile structure 101, each with an OPS disposed within their respective housings and adapted to measure an orientation and/or position of an associated sensing element (e.g., sonar transducer, radar antenna), and each having access to or integrated with a logic device (e.g., controller 130) configured to receive remote sensor returns from the corresponding remote sensing assembly and sensor return orientation and/or position data from the corresponding OPS and generate remote sensor image data based, at least in part, on the remote sensor returns and the sensor return orientation and/or position data. Once the remote sensor image data is received, user interface/controller/OPS 120/130/190 may be configured to render the remote sensor image data on a display of any one of user interface 120, for example. In some embodiments, multiple sets of remote sensor image data may be displayed on the same user interface using one or more geo-referenced, target references, and/or source references overlays.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity/mass of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
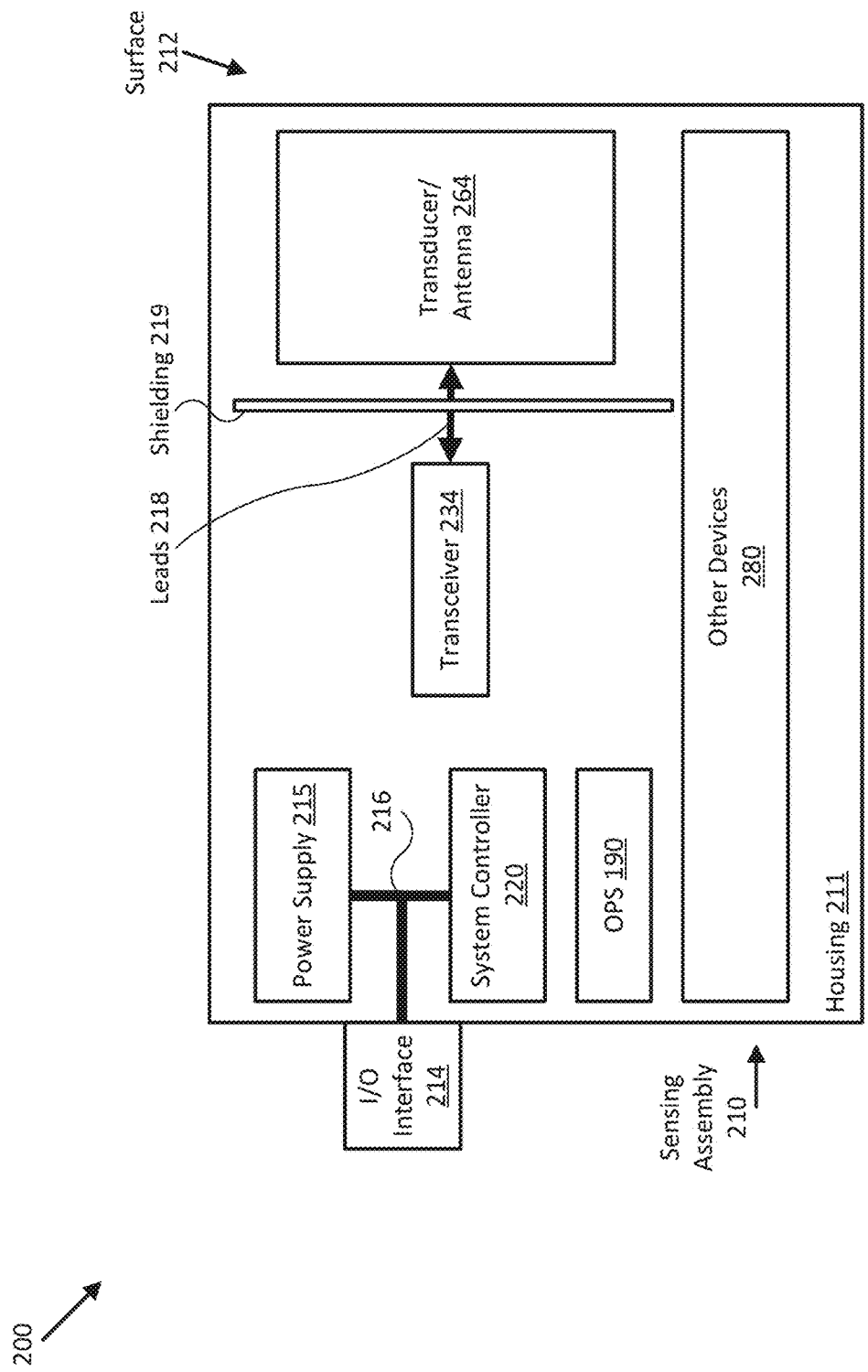
FIG. 2 illustrates a diagram of a remote sensing system including a position sensor in accordance with an embodiment of the disclosure.

FIG. 2 illustrates a diagram of a remote sensing system 200 including a position sensor 190 in accordance with an embodiment of the disclosure. In the embodiment shown in FIG. 2, system 200 includes a remote sensing assembly 210 that can be coupled to a user interface (e.g., user interface 120 of FIG. 1A) and/or a power source through a single I/O cable 214. As shown, remote sensing assembly 210 may include one or more system controllers 220, sensing elements (e.g., transducer/antenna 264), OPS 190, and/or other devices facilitating operation of system 200 all disposed within a common housing 211. In other embodiments, one or more of the devices shown in FIG. 2 may be integrated with a remote user interface and communicate with remaining devices within remote sensing assembly 210 through one or more data and/or power cables similar to I/O cable 214.

Controller 220 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of remote sensing assembly 210 and/or system 200, for example, similar to controller 130. In typical embodiments, controller 220 may be tasked with overseeing general operation of remote sensing assembly 210, generating remote sensor image data from remote sensor returns and sensor return orientation and/or position data, correlating sensor data with remote sensor data/imagery, communicating operational parameters and/or sensor information with other devices through I/O cable 214, and/or other operations of system 200. Controller 220 may in some embodiments be implemented with relatively high resolution timing circuitry capable of generating digital transmission and/or sampling control signals for operating transmitters, receivers, transceivers, signal conditioners, and/or other devices of remote sensing assembly 210, for example, and other time critical operations of system 200, such as per-sample digital beamforming and/or interferometry operations applied to remote sensor returns from sensing element 264, as described herein. In some embodiments, controller 220 may be implemented in a distributed manner across a number of individual controllers.

Transceiver 234 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from controller 220 and to generate transmission signals to excite a transmission channel/element of remote sensing assembly 210 (e.g., sensing element 264, which in some embodiments can be used to transmit remote sensor beams and receive sensor returns) to produce one or more remote sensor beams. In some embodiments, various transmission operations of transceiver 234 (e.g., amplification, frequency dependent filtering, transmit signal frequency, duration, shape, and/or timing/triggering, and/or other signal attributes), may be controlled (e.g., through use of various control signals) by controller 220, as described herein.

Transceiver 243 may also be implemented with one or more analog to digital converters (ADCs), filters, phase adjusters, signal conditioning elements, amplifiers, timing circuitry, logic devices, and/or other digital and/or analog electronics configured to accept analog remote sensor returns from a corresponding receive channel/sensing element of remote sensing assembly 210 (e.g., sensing element 264), convert the analog remote sensor returns into digital remote sensor returns, and provide the digital sensor returns to controller 220. In some embodiments, various receive operations of transceiver 234 (e.g., amplification, frequency dependent filtering, basebanding, sample resolution, duration, and/or timing/triggering, and/or other ADC/signal attributes) may be controlled by controller 220.

For example, controller 220 may be configured to use transceiver 234 to convert a remote sensor return into a digital remote sensor return comprising one or more digital baseband transmissions that are then provided to controller 220. In some embodiments, transceiver 234 may be configured to low-pass or otherwise filter, amplify, decimate, and/or otherwise process the analog and/or digital remote sensor returns (e.g., using analog and/or digital signal processing) prior to providing the digital remote sensor returns to controller 220. In other embodiments, transceiver 234 may be configured to provide substantially unprocessed (e.g., raw) analog and/or digital remote sensor returns to controller 220 for further signal processing, as described herein. In further embodiments, transceiver 234 may be implemented as one or more separate transmitters and receivers.

In the embodiment shown in FIG. 2, sensing element 264 is implemented as a single transmission/receive channel that may be configured to transmit remote sensor beams and receive remote sensor returns through emission surface 212 of housing 211. In some embodiments, remote sending assembly 210 may be implemented with multiple transmission and/or receive channels (e.g., a multichannel sonar transducer, or a multichannel/synthetic aperture radar antenna). In general, remote sending assembly 210 may be implemented with one, two, or many separate elements configured to produce one or more remote sensor beams, and one, two, or many separate sensing elements configured to receive remote sensor returns. The effective volumetric shapes of the remote sensor beams and remote sensor returns may be determined by the shapes and arrangements of their corresponding transducer elements. In multichannel embodiments, the various channels may be arranged to facilitate multichannel processing, such as beamforming, interferometry, inter-beam interpolation, and/or other types of multichannel processing used to produce remote sensor data and/or imagery.

In FIG. 2, each of sensing element 264 is coupled to its electronics over leads 218 and through shielding 219. In various embodiments, leads 218 and/or shielding 219 may be implemented as one or more shielded transmission lines configured to convey analog and/or digital signals between the various elements while shielding transceiver 234 and sensing element 264 from electromagnetic interference from each other, other elements of remote sensing assembly 210 (e.g., OPS 190), and/or external sources. In some embodiments, leads 218 and shielding 219 may be integrated together to form a transmission system. For example, shielding 219 may be configured to provide a ground plane/return for signals conveyed by leads 218.

As shown, remote sensing assembly 210 may be implemented with OPS 190, which may be configured to measure a relative and/or absolute orientation and/or position of remote sensing assembly 210 and/or sensing element 264 and provide such measurements to controller 220. In some embodiments, controller 220 may be configured to combine remote sensor data and/or imagery according to such measurements and/or measurements of an orientation and/or position of a coupled mobile structure to produce combined remote sensor data and/or imagery, such as multiple co-registered remote sensor images, for example, and/or three dimensional remote sensor imagery. In other embodiments, controller 220 may be configured to use orientation and/or position measurements of remote sensing assembly 210 and/or a coupled mobile structure to control one or more actuators (e.g., other devices 280) to adjust a position and/or orientation of remote sensing assembly 210 and/or sensing element 264 and emit remote sensor beams towards a particular position and/or orientation, for example, or otherwise control motion of remote sensing assembly 210 and/or sensing element 264.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of remote sensing assembly 210 and/or sensing element 264. In some embodiments, other devices 280 may include a visible spectrum camera, an infrared camera, and/or other environmental sensors providing measurements and/or other sensor signals that can be displayed to a user and/or used by other devices of remote sensing assembly 210 (e.g., controller 220) to provide operational control of remote sensing assembly 210. In some embodiments, other devices 280 may include one or more actuators adapted to adjust an orientation (e.g., roll, pitch, and/or yaw) and/or a position (longitudinal, lateral, and/or vertical) of remote sensing assembly 210 and/or sensing element 264 relative to a coupled mobile structure, in response to one or more control signals (e.g., provided by controller 220). In other embodiments, other devices 280 may include one or more brackets, such as a transom bracket or a mast bracket, adapted to couple housing 211 to a mobile structure.

Other devices 280 may also include a sensing element angle sensor, for example, which may be physically coupled to housing 211 of remote sensing assembly 210 and be configured to measure an angle between an orientation of sensing element 264 and a longitudinal axis of housing 211 and/or mobile structure 101.

Other devices 280 may also include a rotating platform and/or corresponding platform actuator for sensing element 264 and/or remote sensing assembly 210. In some embodiments, other devices 280 may include one or more Helmholtz coils integrated with OPS 190, for example, and be configured to selectively cancel out one or more components of the Earth's magnetic field, as described herein.

In various embodiments, remote sensing assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between remote sensing assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of remote sensing assembly 210.

Figure 3:
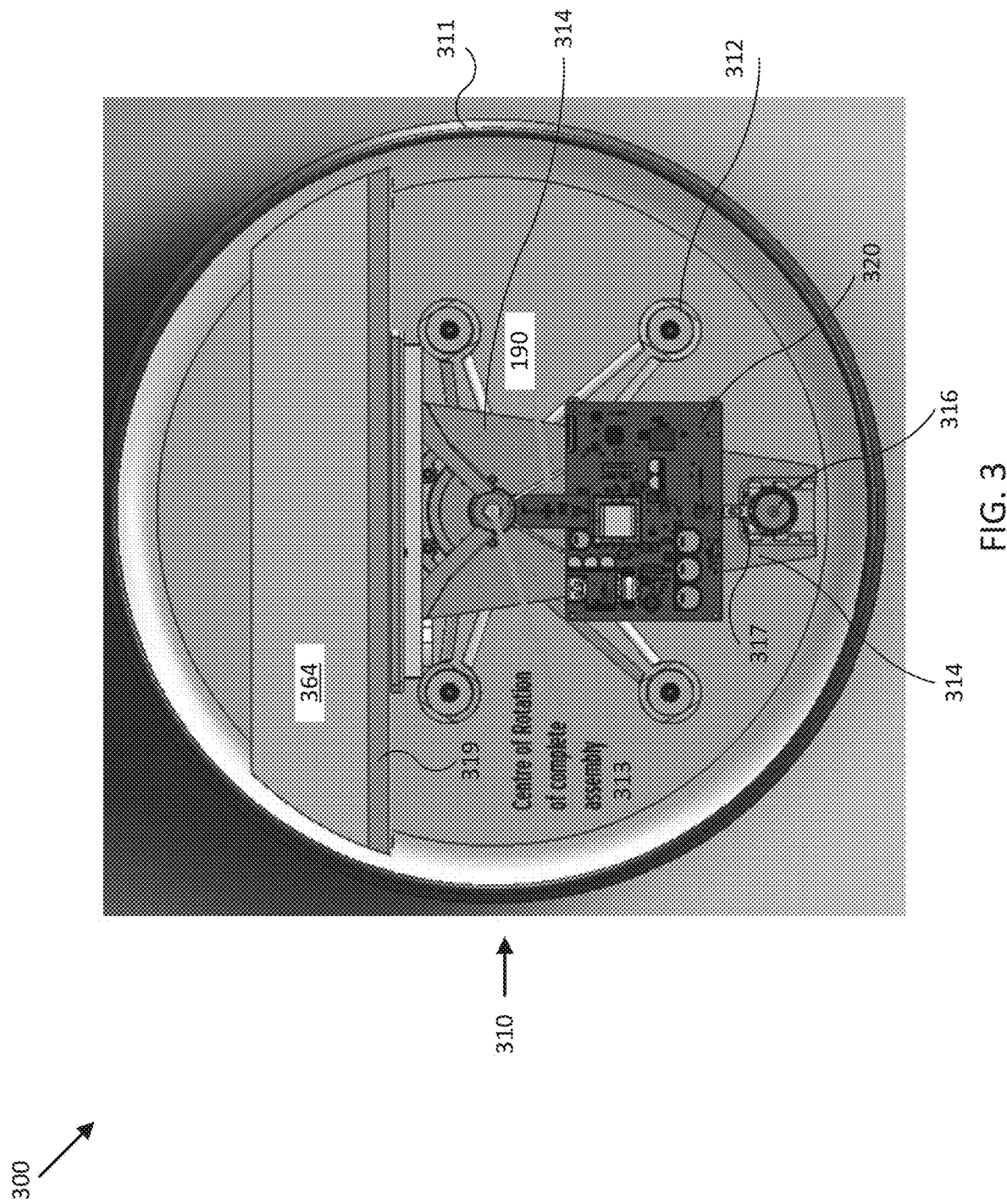
FIG. 3 illustrates a diagram of a remote sensing system including a position sensor in accordance with an embodiment of the disclosure.

FIG. 3 illustrates a diagram of a remote sensing system 300 including a position sensor 190 in accordance with an embodiment of the disclosure. In the embodiment shown in FIG. 3, remote sensing imagery system 300 is implemented as a radar system including a radar sensor assembly 310, housing 311, and radar antenna 364 shielded from system controller 320 and OPS 190 by shielding 319, which correspond to and/or may be implemented similarly to remote sensing assembly 210, housing 211, sensing element 264, controller 220, OPS 190, and shielding 319 of FIG. 2, respectively. Also shown are antenna platform 314 and platform actuator 316 configured to rotate antenna 364, shielding 319, controller 320, and OPS 190 about axis 313, and sensing element (e.g., radar antenna) angle sensor 317 configured to measure an angle between an orientation of antenna 364 and a longitudinal axis of housing 311 (e.g., a vertical line passing perpendicularly through the antenna surface in the orientation shown in FIG. 3). In various embodiments, OPS 190 may be configured to determine an orientation and/or position of remote sensing imagery system 300 while antenna platform 314 is rotating within housing 311. Implementations for corresponding methods are provided in FIGS. 5 through 10 of the present disclosure.

In some embodiments, radar antenna angle sensor 317 may be configured to monitor a position of platform actuator 316, for example, and derive the measured angle from the monitored position. In other embodiments, radar antenna angle sensor 317 may be configured to detect passage over one or more indexed posts 312 corresponding to a known orientation of antenna 364 relative to a longitudinal axis of housing 311. Controller 320 may be configured to receive a measured angle corresponding to a particular known relative orientation when radar antenna angle sensor 317 passes over the appropriate indexed post 312.

Figure 4:
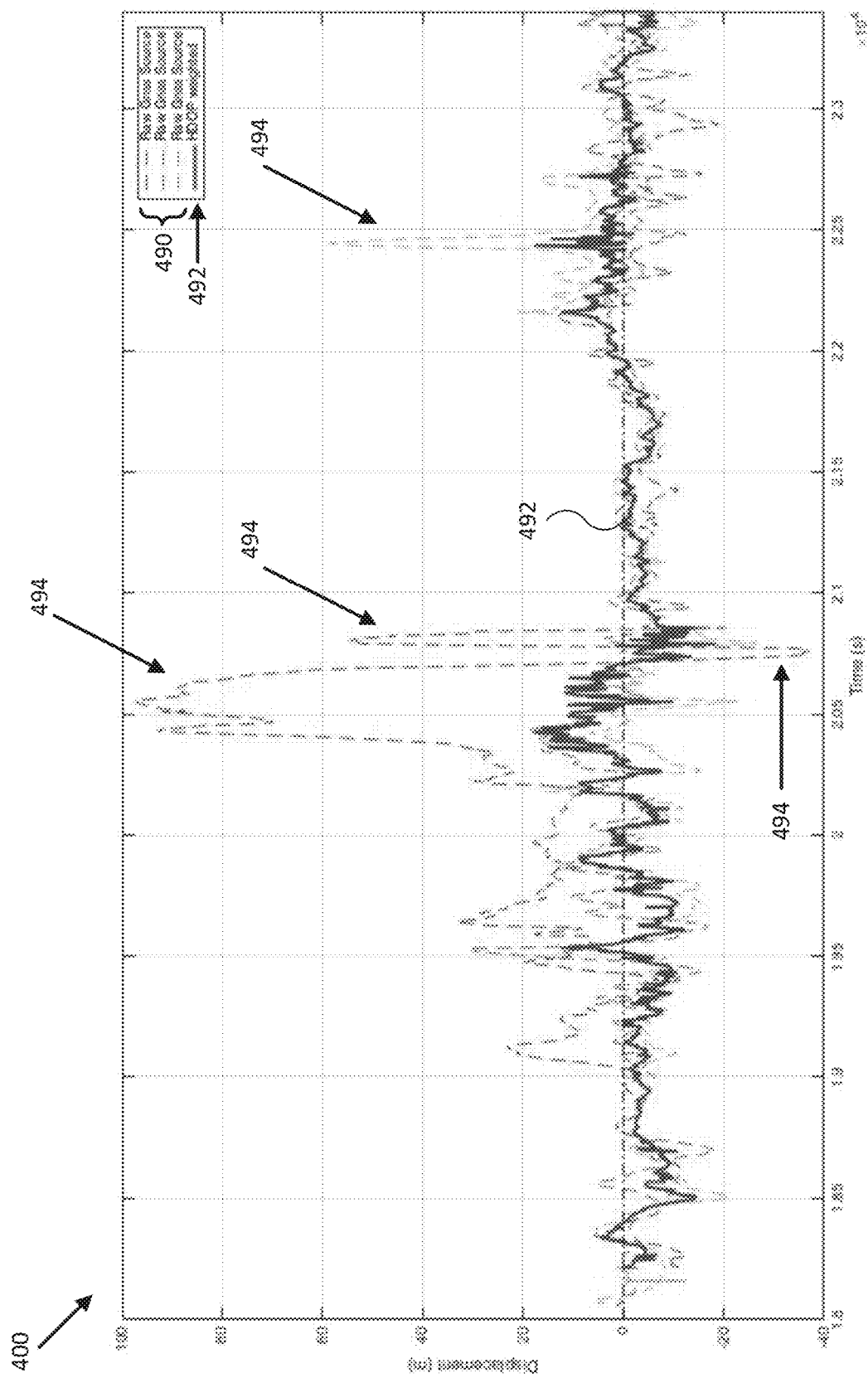
FIG. 4 illustrates a graph of time series of position data from individual position sensors and a corresponding time series of measured positions derived from the position data by a position measurement system in accordance with an embodiment of the disclosure.

FIG. 4 illustrates a graph 400 of time series of position data 490 from three individual position sensors (e.g., radar system/OPS 160/190, user interface/controller/OPS 120/130/190, and secondary user interface/OPS 120/190) and a corresponding time series of measured positions 492 derived from the position data by position measurement system 100 in accordance with an embodiment of the disclosure. In FIG. 4, the time series of measured positions 492 (e.g., one dimensional positions, in FIG. 4) are derived from the time series of position data 490 using a weighting factor based, at least in part, on horizontal dilution of precision fix metadata, similar to that shown in the worked pseudocode example presented herein. FIG. 4 shows that the combined position data (e.g., measured position series 492) deviates less from the mean (shown as "0" displacement in graph 400) than the position data from any individual position sensor 190. Also shown in FIG. 4 are various position data excursion events 494, which may occur at different times and with respect to different time series of position data 490. System 100 may be configured to detect position data excursion events 494, such as by comparing weighted and/or unweighted position data from different sensors to each other, by evaluating deviations in time series of position data and/or corresponding fix metadata (e.g., relative to preselected deviation rates), and/or using other techniques, as described herein.

Figure 5:
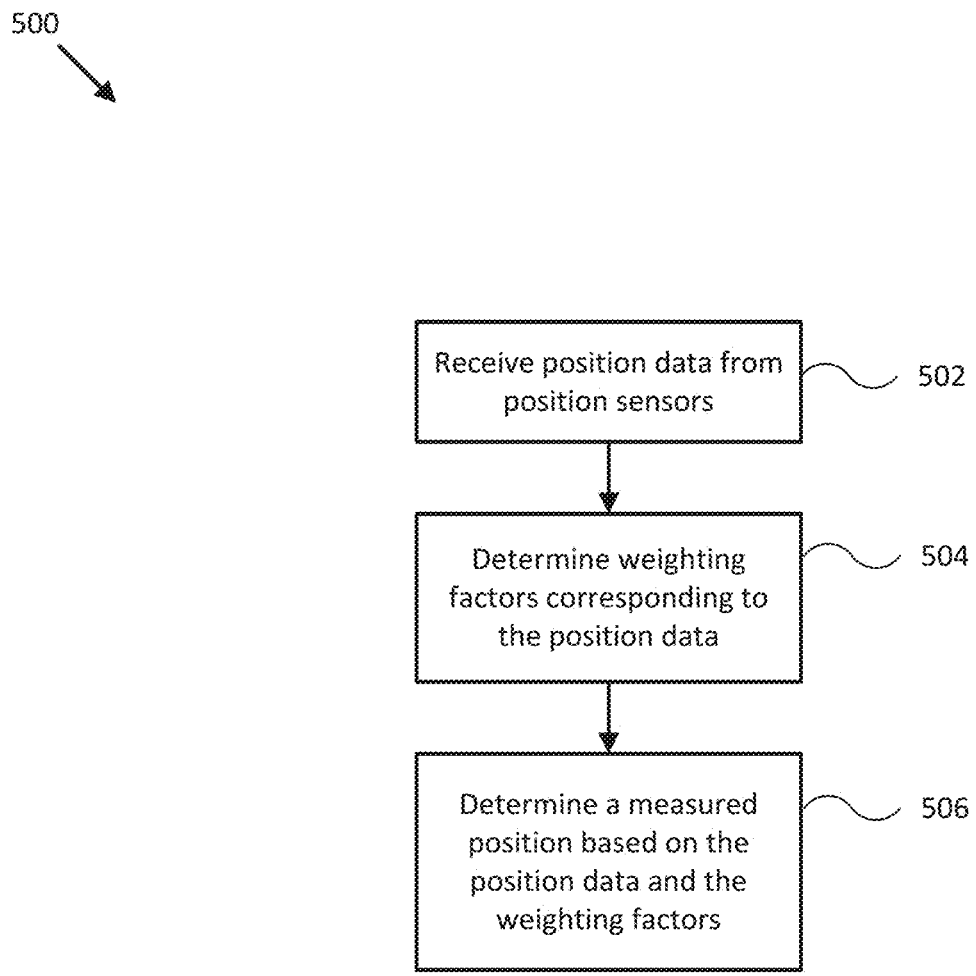
FIG. 5 illustrates a flow diagram of various operations to operate a position measurement system in accordance with an embodiment of the disclosure.

FIG. 5 illustrates a flow diagram of process 500 to provide position measurements for mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 3. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to process 500, and one or more blocks of process 600 of FIG. 6 may be included in process 500. Furthermore, block inputs, block outputs, various sensor signals, sensor information, calibration parameters, and/or other operational parameters may be stored to one or more memories prior to moving to a following portion of a corresponding process. Although process 500 is described with reference to systems described in FIGS. 1A-3, process 500 may be performed by other systems different from those systems and including a different selection of electronic devices, sensors, assemblies, mobile structures, and/or mobile structure attributes.

Process 500 represents a method for providing position measurements using systems 100, 100B, 200, and/or 300 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device receives position data from position sensors. For example, user interface 120 and/or controller 130 of system 100 may be configured to receive position data 490 corresponding to a position of mobile structure 101 from respective position sensors (e.g., radar system/OPS 160/190, user interface/controller/OPS 120/130/190, and secondary user interface/OPS 120/190). Such position data may in various embodiments correspond to a particular remote sensor assembly, a user interface, and/or other element of system 100, for example, and may be subject to an offset relative to a particular position of mobile structure 101, such as a center of mass of mobile structure 101, or a preselected known position of mobile structure 101 (e.g., a mast/deck intersection position, a midpoint position between extents of mobile structure 101, and/or other known positions). Such offsets may be applied to received position data (e.g., added to or subtracted from or otherwise compensated for) upon receipt or as part of block 504, for example.

In various embodiments, the received position data may include fix metadata provided by the corresponding position sensor. Such fix metadata may include one or more reliability metric values, for example, such as position dilution-of-precision, time dilution-of-precision, standard deviation, and/or other reliability metric values determined and provided by the individual position sensors. In additional embodiments, user interface 120 and/or controller 130 may be configured to store position data as a time series of position data in order to determine one or more extrinsic position data reliability metrics (e.g., extrinsic to the position sensor) corresponding to the position data. For example, such extrinsic position data reliability metrics may be derived from a time series of fix metadata, a pattern (e.g., in time and/or space) of position data excursion events with respect to a particular position sensor, and/or time, position, and/or environmentally linked position data or fix metadata deviations or deviation rates relative to preselected (e.g., by user input) deviations or deviation rates.

In some embodiments, one or more of the position sensors may be rotationally coupled to mobile structure 101, such as OPS 190 integrated with radar sensor assembly 310 of FIG. 3. In such embodiments, user interface 120 and/or controller 130 may be configured to receive the position data from the rotationally coupled position sensor while the rotationally coupled position sensor is rotating relative to mobile structure 101. In various embodiments, one or more of the position sensors may be disposed within a housing mounted to mobile structure 101, where the housing encompasses one or more of an accelerometer, a gyroscope, a magnetometer, a float level, a compass, a radar sensor assembly, and/or a sonar sensor assembly, similar to housing 211 of FIG. 2.

In block 504, a logic device determines weighting factors corresponding to the position data received in block 502. For example, user interface 120 and/or controller 130 may be configured to determine weighting factors (e.g., per position sensor) corresponding to the position data received in block 502. Such weighting factors may be per position component, for example, and may or may not be normalized. In embodiments where the received position data includes fix metadata, user interface 120 and/or controller 130 may be configured to determine the weighting factors based, at least in part, on the corresponding fix metadata provided by the respective position sensor (e.g., intrinsic to the position sensor). In other embodiments, user interface 120 and/or controller 130 may be configured to determine the weighting factors based, at least in part, on one or more extrinsic position data reliability metrics (per position sensor) derived at least in part, from historical series of position data from the position sensors. In still further embodiments, the weighting factors may be based on a combination of intrinsic and extrinsic reliability metrics, as described herein. Weighting factors for different position components may be determined differently from each other and/or according to different fix metadata, for example.

In some embodiments, user interface 120 and/or controller 130 may be configured to detect position data excursion events in the received position data and set corresponding weighting factors to an excursion weight upon such detection. In some embodiments, such excursion weight may be zero, for example, or may be a percentage (e.g., 1%, 10%, or other percentage less than approximately 30%) of the non-excursion weighting factor calculated in the normal course.

In block 506, a logic device determines a measured position based on the position data received in block 502 and the weighting factors determined in block 506. For example, user interface 120 and/or controller 130 may be configured to determine a measured position for mobile structure 101 based, at least in part, on the position data received in block 502 and the weighting factors determined in block 504. In some embodiments, user interface 120 and/or controller 130 may be configured to determine such measured position as the weighted average of the position data received in block 502 weighted according to the weighting factors determined in block 504.

In various embodiments, image data, position data, orientation data, and/or sonar data may be acquired and/or processed using measured positions generated by block 506 and may be used to control operation of mobile structure 101, such as by controlling steering sensor/actuator 150 and/or propulsion system 170 to steer mobile structure 101 according to a desired heading, track, one or more waypoints, a tide or wind effect, and/or other types of user and/or environmental input. For example, in some embodiments, one or more of the position sensors may be implemented as a GNSS receiver integrated with user interface 120, and user interface 120 and/or controller 130 may be configured to render a navigational chart on a display of user interface 120, where the navigational chart includes an indicator icon configured to indicate an absolute position and/or orientation of mobile structure 101 on the navigational chart corresponding to the measured position of mobile structure 101 determined in block 506.

It is contemplated that any one or combination of methods to provide remote sensing imagery may be performed according to one or more operating contexts of a control loop, for example, such as a startup, learning, running, and/or other type operating context. For example, process 500 may proceed back to block 502 and proceed through process 500 again to produce updated position measurements and/or associated imagery, as in a control loop.

Figure 6:
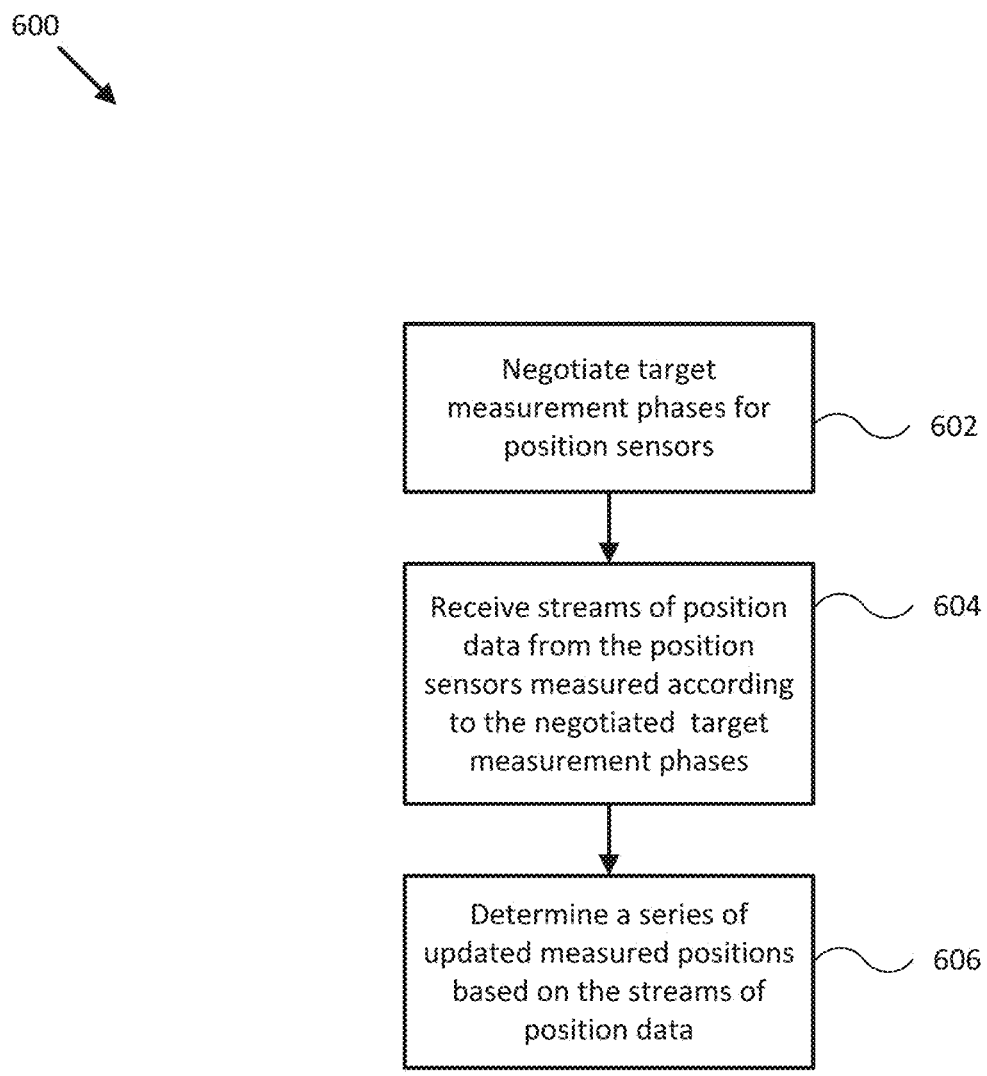
FIG. 6 illustrates a flow diagram of various operations to operate a position measurement system in accordance with an embodiment of the disclosure.

FIG. 6 illustrates a flow diagram of process 600 to provide position measurements for mobile structure 101 in accordance with embodiments of the disclosure. In some embodiments, the operations of FIG. 6 may be implemented as software instructions executed by one or more logic devices associated with corresponding electronic devices, sensors, and/or structures depicted in FIGS. 1A through 3. More generally, the operations of FIG. 6 may be implemented with any combination of software instructions and/or electronic hardware (e.g., inductors, capacitors, amplifiers, actuators, or other analog and/or digital components).

It should be appreciated that any step, sub-step, sub-process, or block of process 600 may be performed in an order or arrangement different from the embodiments illustrated by FIG. 6. For example, in other embodiments, one or more blocks may be omitted from or added to the process, and one or more blocks of process 500 may be added to process 600. Furthermore, block inputs, block outputs, various sensor signals, sensor information, calibration parameters, and/or other operational parameters may be stored to one or more memories prior to moving to a following portion of a corresponding process. Although process 600 is described with reference to systems described in FIGS. 1A-3, process 600 may be performed by other systems different from those systems and including a different selection of electronic devices, sensors, assemblies, mobile structures, and/or mobile structure attributes.

Process 600 represents a method for providing position measurements using systems 100, 100B, 200, and/or 300 in accordance with embodiments of the disclosure. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device negotiates target measurement phases for position sensors. For example, user interface 120 and/or controller 130 of system 100 may be configured to negotiate target measurement phases for respective position sensors each coupled to mobile structure 101 at different locations, where the target measurement phases are different from each other. In various embodiments, user interface 120 and/or controller 130 may be configured to negotiate the target measurement phases by receiving, from the position sensors, measurement rates corresponding respectively to the position sensors, determining the target measurement phases based, at least in part, on the respective measurement rates, where a combined measurement rate corresponding to the target measurement phases is greater than the first or second measurement rate, and controlling the position sensors to perform position measurements according to the respective target measurement phases.

For example, GNSS based position sensors may receive an absolute time from the GNSS and/or include an internal measurement clock that may be used to help derive a position of the position sensor based on timing differences between signals received from different satellites. User interface 120 and/or controller 130 may be configured to use individual measurement rates from each position sensor to stagger, delay, or otherwise organize relative measurement times between each position sensor (e.g., identify corresponding target measurement phases/times between measurements by different position sensors) so that the effective update rate of the measured position of mobile structure 101, as determined by system 100, is greater than the maximum measurement rate for any single position sensor within system 100.

Such target measurement phases may be relative to an absolute time, as measured/received by all the position sensors individually, or may be relative to individual internal measurement clocks for each position sensor, as negotiated by user interface 120 and/or controller 130, and/or according to the timing capability of the particular position sensor. Such target measurement phases dictate the time when the position sensor makes its measurement (e.g., samples signals received from satellites), which is conceptually distinct from the time when the position sensor transmits updated position data (e.g., over a network to user interface 120 and/or controller 130). Notably, in various embodiments, position data from position sensors described herein often includes an absolute time stamp roughly approximate to the absolute time when the position measurement was made.

In block 604, a logic device receives streams of position data from position sensors measured according to the target measurement phases negotiated in block 602. For example, user interface 120 and/or controller 130 may be configured to receive streams of position data corresponding to mobile structure 101 from respective position sensors and measured according to the respective target measurement phases negotiated in block 602, where each measured position within each stream of position data is measured according to its respective target measurement phase.

In block 606, a logic device determines a series of updated measured positions based on the streams of position data received in block 604. For example, user interface 120 and/or controller 130 may be configured to determine a series of updated measured positions for mobile structure 101 based, at least in part, on the streams of position data received in block 604, where an update rate corresponding to the series of updated measured positions is greater than a maximum measurement rate corresponding to any individual position sensor in system 100. In some embodiments, the series of updated measured positions may be weighted according to the intrinsic and/or extrinsic weighting factors determined in block 504 of process 500. In such embodiments, position data with relatively low weighting factors (or weighting factors of zero) may be replaced and/or supplemented by an extrapolated position derived by extrapolating from a trend in adjacent position data provided by one or more different position sensors (e.g., adjacent in terms of target measurement phase).

For example, in the event that a first one of three position sensors is experiencing a position data excursion event, and the three position sensors have negotiated a complete cyclical target measurement, phase distribution (e.g., each position sensor only repeats its measurement after the other two position sensors have made their measurements), the measured position of mobile structure 101, at the time of the first position sensor target measurement phase, may be determined by extrapolating from the trend in position indicated by the adjacent position data from the second and third position sensors. In alternative embodiments, other sensor data may be used to help guide and/or refine such extrapolation, such as combining heading data (e.g., provided by orientation sensor 140) and speed data (e.g., provided by speed sensor 142) and the most recent viable position data to determine an estimated updated position for mobile structure 101 at the time of the first position sensor target measurement phase, and using the estimated updated position as the measured position of mobile structure 101, or combining such estimated updated position with the extrapolated position according to a preselected weighting function, for example.

In various embodiments, image data, position data, orientation data, and/or sonar data may be acquired and/or processed using measured positions generated by block 606 and may be used to control operation of mobile structure 101, such as by controlling steering sensor/actuator 150 and/or propulsion system 170 to steer mobile structure 101 according to a desired heading, track, one or more waypoints, a tide or wind effect, and/or other types of user and/or environmental input. For example, in some embodiments, one or more of the position sensors may be implemented as a GNSS receiver integrated with user interface 120, and user interface 120 and/or controller 130 may be configured to render a navigational chart on a display of user interface 120, where the navigational chart includes an indicator icon configured to indicate an absolute position and/or orientation of mobile structure 101 on the navigational chart corresponding to the measured position of mobile structure 101 determined in block 606.

It is contemplated that any one or combination of methods to provide remote sensing imagery may be performed according to one or more operating contexts of a control loop, for example, such as a startup, learning, running, and/or other type operating context. For example, process 600 may proceed back to block 602 and proceed through process 600 again to produce updated position measurements and/or associated imagery, as in a control loop.

Embodiments of the present disclosure can thus provide accurate and reliable position measurements for a mobile structure. Such embodiments may be used to provide sonar, radar, and/or other remote sensing imagery to assist in navigation for the mobile structure, survey of a body of water, and/or to assist in the operation of other systems, devices, and/or sensors coupled to the mobile structure.

Conventional GNSS systems are typically subject to "random walk" (noise on the absolute latitude/longitude signals) and/or other noise or variability in the position data they provide. While velocity measurements can be derived from position data by subtracting two position measurements and dividing by the time in between the position measurement, such position-derived velocity measurements are typically subject to the same noise issues from which the conventional GNSS systems suffer. Embodiments described herein employ a different velocity measurement that is derived from the GNSS receiver (e.g., GNSS 146) to satellite Doppler shift (a key differentiation, as the noise profile of the Doppler-derived velocity is typically significantly better than the noise profile for the absolute position measurements).

When integrated over a relatively short time (e.g., approximately 1400 seconds or less), Doppler-derived velocity measurements can provide a more reliable relative position measurement (e.g., relative to an arbitrary starting position) than any individual GNSS position measurement (e.g., error less than 2 meters over an integration time of approximately 1400 seconds, with 10 Hz measurement rate). This reliability is particularly useful for assisted or autonomous docking, such as the systems and methods described in U.S. Provisional Patent Application 62/671,394 filed May 14, 2018 and entitled "AUTOPILOT INTERFACE SYSTEMS AND METHODS," which is incorporated herein by reference in its entirety, where absolute position on the earth is not as relevant as the relatively short-term odometry relative to an arbitrary starting position, which can be used with a time series of perimeter sensing data to reliably and precisely monitor the surrounding navigation hazards during various assisted or autonomous docking or general autopiloting maneuvers, as described herein.

A brief pseudocode process is as follows: upon starting a docking or autopilot session, initialize an estimated relative position of mobile structure 101 to a preselected value, such as a position measurement by GNSS 146 or zero (all components of the position); take regular measurements of the Doppler-derived velocity, which may occur at a known common and substantially constant time interval (e.g. 10 Hz, so that dt=0.1 s); update the estimated relative position with the following formula at every time interval (altitude may be ignored due to low-quality data and lack of relevance to typical marine navigation):

$$NewPositionX = OldPositionX + CurrentVelX * dt$$

$$NewPositionY = OldPositionY + CurrentVelY * dt$$

Where CurrentVelX and CurrentVelY are the non-vertical Doppler-derived velocity components in absolute coordinates. This algorithm is compact and efficient enough that it can be executed in a time-critical thread to aid synchronization with regular (in time) GNSS Doppler-derived velocity measurements, when it is desired that dt be constant over a series of measurements.

Figure 7:
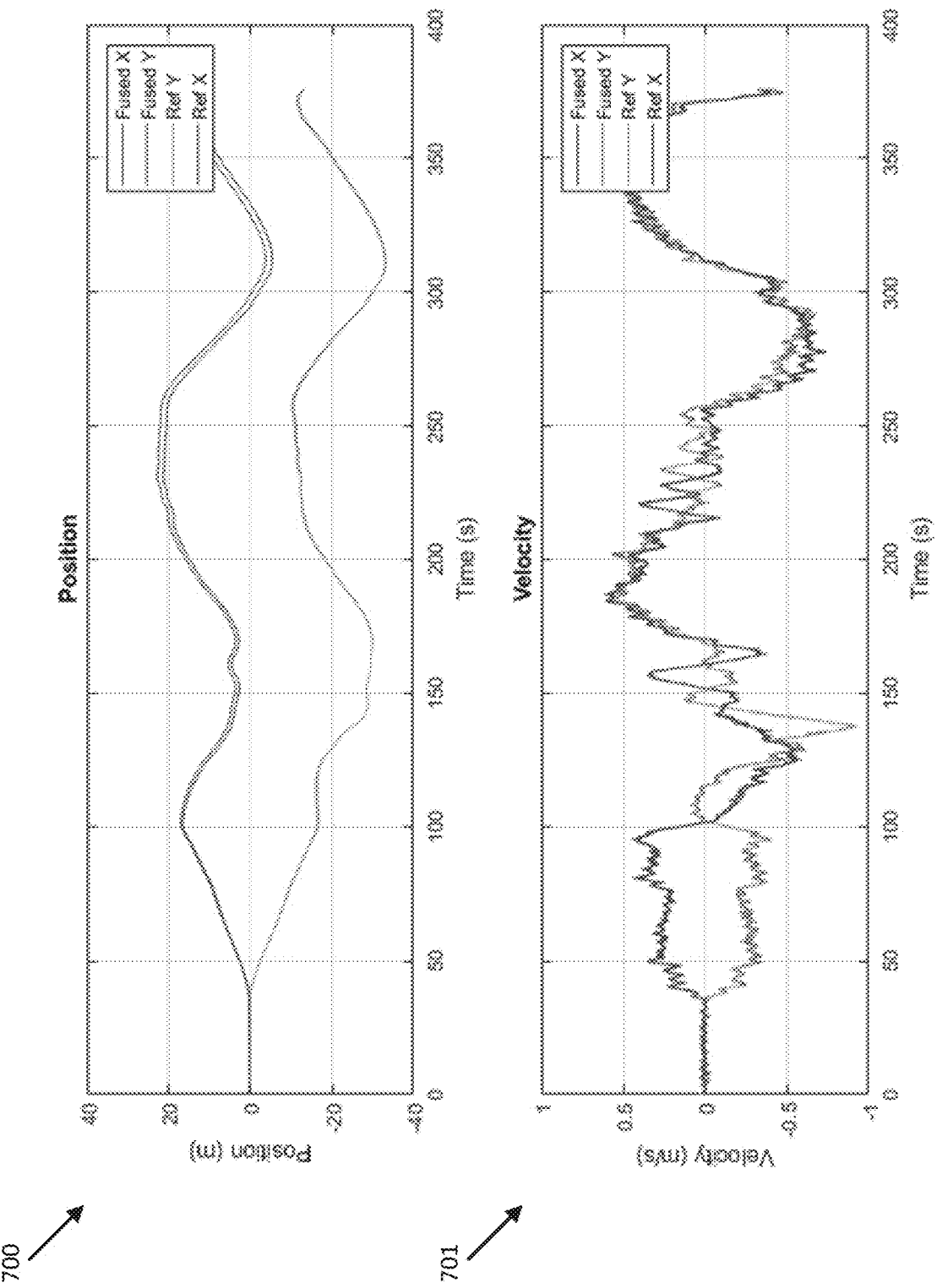
FIGS. 7-8 illustrate graphs of time series of position and velocity data derived from Doppler-derived velocities provided by a position measurement system in accordance with an embodiment of the disclosure.
Figure 8:
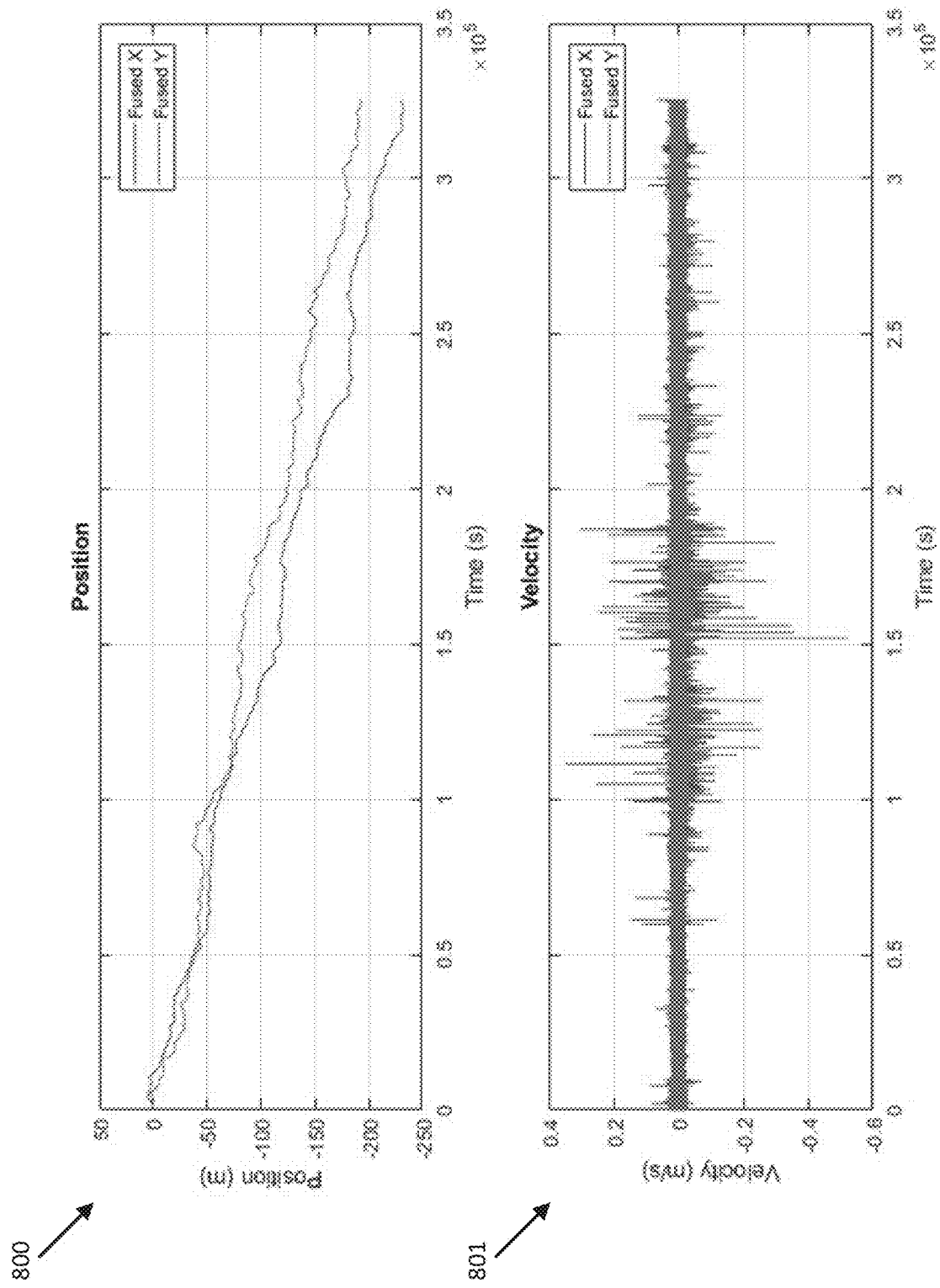

Doppler-derived velocity measurements are very sensitive to satellite geometry (generally affected by field-of-view of sky), such that satellites closer to the horizon, and more satellites participating in the measurement, are particularly beneficial to the Doppler-derived velocity measurements. Fortunately, unlike the case with typical terrestrial GNSS applications, excellent line of sight to the horizon (or near to the horizon) can be achieved relatively easily in a marine environment (e.g., less likely for the horizon to be occluded by high buildings or mountains, and more likely to be able to mount GNSS 146 atop a mast). FIGS. 7-8 illustrate the minimal drift over 400 seconds and 96 hours, respectively, which is about 4.2 cm/minute, and which can be improved by slightly filtering the Doppler-derived velocity measurements.

FIGS. 7-8 illustrate graphs of time series of position and velocity data derived from Doppler-derived velocities provided by a position measurement system in accordance with an embodiment of the disclosure. In FIG. 7, graph 700 shows reference position data provided by a reference GPS system providing centimeter-level position precision (Ref X and Y) as mobile structure 101 is maneuvered, and graph 701 shows the same reference position data differentiated to provide a reference velocity. Graph 701 also shows Doppler-derived velocity data (Fused X and Y) provided by GNSS 146, and graph 700 shows the same Doppler-derived velocity data integrated to provide integrated position data. As can be seen in the two graphs, the Doppler-derived velocity data and the resulting integrated position data show very little or zero drift from the reference position and velocity data over a time period of approximately 400 seconds. Graphs 800 and 801 of FIG. 8 show just the Doppler-derived velocity data (graph 801) and the resulting integrated position data (graph 800) as they evolve over approximately 96 hours while mobile structure 101 is kept stationary. Similar results are produced when optional augmentation features are turned off, such as satellite-based augmentation systems (SBAS).

The accuracy of the position and velocity measurements provided by a GNSS receiver is significantly dependent upon having a clear view of the satellites in the sky, and therefore the best place to mount the antenna on a vessel is typically high up on the vessel. However, the further the GPS antenna is located away from the roll and pitch center of the vessel (e.g., the center of mass, or center of gravity), the more the antenna will move relative to the center of the vessel in rough seas. When travelling at low speeds or stationary, the velocity and change in position of the GNSS antenna can be greater than the true motion of the vessel center, rendering the resulting GNSS measurements unsuitable for autonomous control of the vessel at low speeds or for holding the vessel at a stationary position.

Some GNSS implementations provide filtering of the velocity measurements, which are typically provided as speed over ground and course over ground measurements. These velocity filters provide an average of the velocity measurements over a fixed time period that attempt to average out oscillating motion; however, the filtering often results in velocity measurements with significant latency, which renders them unsuitable for real time control of a vessel. By using the roll, pitch, and/or yaw measurements to determine and compensate for GNSS antenna movement, the position and velocity at the center of the vessel can be more reliably estimated.

Experiments have proven that the exact transformation between the roll and pitch center of mass frame and the GNSS antenna frame can be difficult, if not impossible, to measure using conventional techniques, as the position of the center of mass may be an arbitrary point dependent on time, vessel loading, and fuel level, for example. Embodiments presented here provide a method of automatic measurement of such transformation.

Removing attitude-induced motion from the GNSS velocity using a known GNSS offset vector:

Using time stamped angular orientation (roll, pitch, and/or yaw) measurements received from an attitude and heading reference system (AHRS) device (e.g., an embodiment of OPS 190) and the offset in three dimensional space of the GNSS antenna from the roll and pitch center of mobile structure 101, the relative position of the GNSS antenna (e.g., GNSS 146) with respect to the vessel center can be calculated in an absolute coordinate frame. These offsets can be applied to the corresponding time stamped position measurements from the GNSS receiver to correct for the rotational motion of the vessel, which may be oscillating in nature. A pseudocode implementation is as follows: determine a transformation matrix from an absolute roll, pitch, and yaw of mobile structure 101 (e.g., provided by OPS 190); multiply the transformation matrix by the three dimensional vector of the GNSS antenna (e.g., at radar system/OPS 160/190) relative to the roll and pitch center of mass of mobile structure 101; and use the calculated absolute offset of the GNSS antenna to correct the position measurement provided by the GNSS receiver.

Using time stamped angular velocity (rates of change of roll, pitch and yaw) received from an AHRS device (e.g., OPS 190) and the offset in three-dimensional space of the GNSS antenna from the roll and pitch center of the vessel, the translational or linear velocity of the GNSS antenna with respect to the vessel center/center of mass can be calculated. The linear velocity measurements from GNSS 146 can be corrected using the calculated linear velocity caused by the angular rotation of mobile structure 101. These calculations can be performed in either an absolute or relative coordinate frame as desired. A pseudocode implementation is as follows: calculate transformation matrix from the roll, pitch, and yaw of mobile structure 101 to convert the angular velocity of mobile structure 101 and/or the absolute linear velocity of GNSS 146 into a consistent coordinate frame; calculate the linear velocity of GNSS 146 relative to the roll and pitch center of mass of mobile structure 101 by calculating the cross product of (1) the three dimensional vector to GNSS 146 relative to the roll and pitch center of mass of mobile structure 101 with (2) the angular velocity of mobile structure 101; and use the calculated linear velocity of GNSS 146 caused by the roll, pitch, and yaw of mobile structure 101 to correct the linear velocity measurement provided by GNSS 146.

An additional simplification of this method can be implemented when GNSS 146 is at an approximately fixed height above a flat plane throughout the period of operation, such as during a typical docking maneuver. This simplification allows inaccuracies in the measured altitude from GNSS 146 to be ignored by replacing the measured altitude with a user defined constant defined when mobile structure 101 has zero roll and pitch. It is still necessary to adjust this user defined GNSS height by calculating the change in height caused by the roll and pitch about the roll and pitch center of mass of mobile structure 101 using the method previously described, such that the corrected altitude of the roll and pitch center of mass of mobile structure 101 remains fixed relative to the flat plane. Applying a similar simplification to the velocity, the velocity along the vertical axis may be set to zero at the roll and pitch center of mass of mobile structure 101, and therefore the velocity of GNSS 146 along the vertical axis can be derived based on the angular velocity of mobile structure 101 and the offset of GNSS 146 from the roll and pitch center of mass of mobile structure 101.

Removing attitude-induced motion from the GNSS velocity with an unknown GNSS offset vector:

This method is based upon the concept that the angular velocity signal is present in the vessel-relative linear velocity signal, subject to an amplitude scalar (from lateral GNSS offset) and group delay offset (from measurement delay). Once the measurement delay and amplitude scalar between the angular and linear velocity have been identified, they can be used to superpose a scaled and delayed version of the angular velocity over the linear velocity, which can be used to remove the angular velocity component from the linear velocity. Note: "vessel-relative velocity/GNSS" refers to the geo-referenced (North, East) absolute velocities rotated by the vessel heading to give forward/left velocities.

In various embodiments, the linear and angular velocities may be buffered such that a significant number of roll/pitch cycles (>20, so approx. 60 s for 20 0.33 Hz typical roll cycles) are buffered and converted to the same sampling rate (typically the AHRS is 100 Hz where the GNSS is 10 Hz). The sample rate conversion can take place using a multi-stage polyphase decimation or interpolation filter as appropriate, for efficiency gains for high decimation ratios on low-cost hardware. Three techniques for calculating the GNSS offset vector are described herein.

In a first technique, the cross-correlation of the angular velocity and linear velocity is determined (with a window the size of the maximum expected measurement delay, realistically <500 ms). The first peak in the cross-correlation is identified and scaled by the energy of the angular velocity signal (to determine the amplitude scalar) and the location of the peak is identified to determine the measurement delay. Benefits of this approach include delay measurement accuracies down to one sample and efficient implementation using relatively fast FFT-based convolution. Disadvantages include relatively high memory usage (120000 samples for 60 s of 100 hz, for two components.

In a second technique, the linear and angular velocity signals (e.g., a series of measurements) are independently down-sampled to just above Nyquist for the expected dominant frequency of the angular velocity (~0.33 Hz, so 0.7 samples/s, for example). The amplitude and phase of the angular velocity frequency (e.g., the amplitude scalar and measurement delay of the angular velocity component, assuming an oscillation) may be derived via a complex FFT (e.g., a spectral analysis) of the 60 s buffer (now only ~85 samples).

In a third technique, the linear and angular velocity signals are independently down sampled to just above Nyquist for the expected roll frequency (~0.33 Hz, so 0.7 samples/s, for example). The signals are then matched using a 2-dimensional optimization algorithm (e.g., a fitting routine), controlling amplitude and the delay of a fractional delay filter (to effect a sub-sample group delay).

Once any one of the above techniques have been used to identify the amplitude scalar and measurement delay, the measurement delay is applied to the original angular velocity signal (at the original sample rate) and the amplitude-scaled version is superposed onto the linear velocity signal (at the AHRS sample rate) as described herein to remove the angular velocity component from the linear velocity. It is acceptable to up sample the GNSS measurements to the AHRS sample rate using previous-neighbor interpolation with no low pass filtering. If GNSS 146 is laterally offset from the roll and pitch center of mass of mobile structure 101, this lateral offset may optionally be provided manually to aid the automatic calculation process. Once the estimated linear velocity of mobile structure 101 is determined, using any of the techniques described above, the GNSS offset vector may be determined based on the angular velocity component (e.g., characterized by the amplitude scalar and the measurement delay) of the linear velocities provided by GNSS 146, for example, and/or comparison with the angular velocities of mobile structure 101 provided by OPS 190.

When mapping the environment around a free moving vessel using sensors that produce spatial data, such as stereo cameras (e.g., other modules 180), it is beneficial to accurately know the orientation and position of the sensors in the world reference frame. By using GNSS 146 and an AHRS (e.g., OPS 190) to determine the origin and orientation of the sensors in the world frame, the 3D spatial data can be correctly aligned to the world, such as to form an accurate map or chart.

The position of the spatial measurement sensors relative to GNSS 146 can be set by the installer within an acceptable tolerance; however, small errors in pitch and rotation of the sensor relative to the measured pitch and roll from the AHRS can result in inaccurate measurements in 3D spatial data, particularly when measuring the position of objects at a significant distance. When the spatial measurement sensors are mounted high up on a large vessel, the sensors are likely to be tilted downward so that the field of view of the sensor covers the perimeter of the vessel, which makes measuring the alignment to the vessel and the subsequent alignment to the vessel AHRS difficult. It is also possible that small changes in alignment could occur over time, depending on the rigidity of the sensor mountings, which would normally require periodic realignment. Embodiments provided herein automatically measure the alignment of the spatial sensors with the AHRS measurements, and so installation can be greatly simplified, and the alignment can optionally be re-calibrated at a later date, thereby obviating the need to do so through physical manipulation of the spatial sensors themselves.

To determine the orientation of a spatial measurement sensor (e.g., radar system 160) mounted on mobile structure 101 relative to an absolute coordinate frame, compared with the attitude of mobile structure 101 as measured with an AHRS (e.g., OPS 190) attached to mobile structure 101, 3D point data (e.g., spatial data, imaging data, ranging data, radar data) from the spatial measurement sensor may be recorded along with roll and pitch data, corresponding to an attitude of mobile structure 101, provided by OPS 190 at the same point in time. By ensuring that the entire field of view of the spatial measurement sensor contains open water surrounding mobile structure 101, it can be assumed that this will be measured as a flat horizontal plane in world space, which will align with a roll and pitch of zero degrees measured by OPS 190.

By analyzing the 3D spatial data from the spatial measurement sensor and using plane fitting, such as a random sample consensus (RANSAC) or least squares plane fit, or Hough plane fitting, the orientation of the water plane within the measured spatial data can be determined. This can then be compared with the corresponding measurements from OPS 190 at the same point in time, which will allow the relative orientation between the spatial sensor and OPS 190 to be calculated and stored. By performing multiple measurements over a period time, errors in the detection of the horizontal plane can be averaged. By repeating the process of capturing multiple frames of 3D point data at varying degrees of roll and pitch of mobile structure 101, it is also possible to determine the direction of the spatial measurement sensor relative to the forward direction of mobile structure 101. To simplify the alignment process, the direction of the of the spatial measurement sensor relative to the forward direction of the vessel may optionally be provided (e.g., as user input). In some embodiments, the spatial measurement sensor may be integrated with its own OPS 190 and orientation data provided by the spatial measurement sensor may be used to refine or provide the orientation of the water plane within the measured spatial data, as described herein.

This alignment method can be performed with a plurality of spatial measurement sensors mounted at different positions and orientations about mobile structure 101. The calculated orientations of each sensor can subsequently be used in conjunction with GNSS 146, attitude and heading from OPS 190, and various user defined position offsets of sensors from GNSS 146 to orient the 3D spatial data from the sensors in and absolute coordinate frame/space. For example, the spatial data may be oriented in an absolute coordinate frame and rendered in or as a navigational chart on a display of user interface 120.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a position sensor coupled to a mobile structure and configured to provide a Doppler-derived velocity corresponding to motion of the position sensor; and
a logic device configured to communicate with the position sensor in an assisted or autonomous navigation operation, wherein the logic device is configured to:
initialize an estimated relative position of the mobile structure to a preselected value irrelevant to an absolute position of the mobile structure on earth;
receive the Doppler-derived velocity from the position sensor at consecutive time points during the navigation operation; and
determine an estimated relative position of the mobile structure corresponding to each said time point based, at least in part, on the received Doppler-derived velocity for the time point and a prior estimated relative position of the mobile structure.

2. The system of claim 1, wherein:
the determining the estimated relative position of the mobile structure comprises determining, for each position component, the sum of the prior estimated relative position with a product of the Doppler-derived velocity and a time interval between the receiving the Doppler-derived velocity and the receiving the prior Doppler-derived velocity.

3. The system of claim 1, wherein:
the prior estimated relative position comprises non-vertical position components; and
the determining the estimated relative position of the mobile structure comprises determining, for each non-vertical position component, the sum of the prior estimated relative position with a product of the Doppler-derived velocity and a time interval between the receiving the Doppler-derived velocity and the receiving the prior Doppler-derived velocity while disregarding a vertical position component of the mobile structure.

4. The system of claim 1, wherein:
the mobile structure comprises a watercraft; and
time intervals between the consecutive time points are approximately equal to each other.

5. The system of claim 1, wherein the preselected value has only zero components as denoting a position of the mobile structure at a start of the navigation operation.

6. The system of claim 1, wherein the mobile structure is a watercraft, and the navigation operation is at most 1400 seconds in duration.

7. The system of claim 1, wherein the navigation operation is an assisted docking operation.

8. The system of claim 1, wherein the navigation operation is an autonomous docking operation.

9. A system comprising:
a position sensor coupled to a mobile structure and configured to provide an absolute position of the position sensor;
an orientation sensor coupled to the mobile structure and configured to provide an absolute orientation of the mobile structure; and
a logic device configured to communicate with the position sensor and the orientation sensor, wherein the logic device is configured to:
receive the absolute orientation of the mobile structure from the orientation sensor and the absolute position of the position sensor from the position sensor;
determine a transformation matrix based, at least in part, on the received absolute orientation of the mobile structure;
determine an absolute position offset associated with the position sensor based, at least in part, on the received absolute orientation of the mobile structure, the determined transformation matrix, and a relative position vector from a center of mass of the mobile structure to a mounting position of the position sensor on the mobile structure; and determine an estimated absolute position of the mobile structure based, at least in part, on the absolute position received from the position sensor and the determined absolute position offset.

10. The system of claim 9, wherein:

the position sensor is configured to provide an absolute linear velocity corresponding to motion of the position sensor;

the orientation sensor is configured to provide an angular velocity of the mobile structure; and the logic device is configured to:

receive the absolute linear velocity of the position sensor from the position sensor and the angular velocity of the mobile structure from the orientation sensor;

determine a relative linear velocity of the position sensor, relative to the center of mass of the mobile structure, based, at least in part, on the relative position vector and the received angular velocity; and determine an estimated linear velocity of the mobile structure based, at least in part, on the received absolute linear velocity of the position sensor and the determined relative linear velocity of the position sensor.

11. The system of claim 10, wherein the logic device is configured to:

set a vertical component of the absolute position received from the position sensor to a preselected constant value prior to the determining the estimated absolute position of the mobile structure; and/or set a vertical component of the absolute linear velocity received from the position sensor to zero prior to the determining the estimated linear velocity of the mobile structure.

12. The system of claim 9, wherein:

the position sensor is configured to provide a time series of absolute linear velocities corresponding to motion of the position sensor;

the orientation sensor is configured to provide a time series of angular velocities of the mobile structure; and the logic device is configured to:

receive the absolute linear velocities of the position sensor from the position sensor and the angular velocities of the mobile structure from the orientation sensor; and determine an estimated linear velocity of the mobile structure based, at least in part, on the received absolute linear velocities of the position sensor and the received angular velocities of the mobile structure.

13. The system of claim 12, wherein the determining the estimated linear velocity of the mobile structure comprises:

determining a cross-correlation of the received angular velocities of the mobile structure and the received absolute linear velocities of the position sensor, and determining an amplitude scalar and a measurement delay corresponding to an angular velocity component of the received absolute linear velocities of the position sensor based on a first peak identified in the determined cross-correlation; or downsampling the received angular velocities of the mobile structure and the received absolute linear velocities of the position sensor to a preselected sample rate above a Nyquist frequency for an expected dominant frequency of the angular velocity component of the received absolute linear velocity of the position sensor, and determining the amplitude scalar and the measurement delay corresponding to the angular velocity component based on a spectral analysis of the downsampled angular velocities of the mobile structure and/or the downsampled absolute linear velocities of the position sensor; and determining the estimated linear velocity of the mobile structure by removing the angular velocity component from the received absolute linear velocities of the position sensor based, at least in part, on the determined amplitude scalar and measurement delay.

14. The system of claim 9, further comprising a spatial measurement sensor coupled to the mobile structure and configured to provide spatial data corresponding to an environment about the mobile structure, wherein the logic device is configured to:

receive the absolute orientations of the mobile structure from the orientation sensor and the spatial data from the spatial measurement sensor;

determine a set of relative orientations of a water plane represented within the spatial data corresponding to a set of measurement times, relative to a sensor orientation corresponding to the spatial measurement sensor;

identify a set of absolute orientations of the mobile structure corresponding to the set of measurement times based, at least in part, on the received absolute orientations of the mobile structure; and determine a relative sensor orientation corresponding to the spatial measurement sensor, relative to the orientation sensor, based, at least in part, on the determined set of relative orientations of the water plane, the identified set of absolute orientations of the mobile structure, and a known absolute orientation of the water plane.

15. The system of claim 14, wherein the logic device is configured to:

receive absolute positions of the position sensor from the position sensor; and determine a relative sensor position corresponding to the spatial measurement sensor, relative to the position sensor, based, at least in part, on the determined relative sensor orientation corresponding to the spatial measurement sensor and the received absolute positions of the position sensor.

16. A method comprising:

receiving a Doppler-derived velocity corresponding to motion of a position sensor coupled to a mobile structure;

determining an estimated relative position of the mobile structure based, at least in part, on the received Doppler-derived velocity and a prior estimated relative position of the mobile structure;

receiving an absolute orientation of the mobile structure from an orientation sensor coupled to the mobile structure and an absolute position of the position sensor coupled to the mobile structure;

determining a transformation matrix based, at least in part, on the received absolute orientation of the mobile structure;

determining an absolute position offset associated with the position sensor based, at least in part, on the received absolute orientation of the mobile structure, the determined transformation matrix, and a relative position vector from a center of mass of the mobile structure to a mounting position of the position sensor on the mobile structure; and determining an estimated absolute position of the mobile structure based, at least in part, on the absolute position received from the position sensor and the determined absolute position offset.

17. The method of claim 16, further comprising:

receiving an absolute linear velocity of the position sensor from the position sensor and an angular velocity of the mobile structure from the orientation sensor;

determining a relative linear velocity of the position sensor, relative to the center of mass of the mobile structure, based, at least in part, on the relative position vector and the received angular velocity; and determining an estimated linear velocity of the mobile structure based, at least in part, on the received absolute linear velocity of the position sensor and the determined relative linear velocity of the position sensor.

18. A method of claim 16, further comprising:

receiving absolute linear velocities of a position sensor coupled to a mobile structure and angular velocities of the mobile structure from an orientation sensor coupled to the mobile structure; and determining an estimated linear velocity of the mobile structure based, at least in part, on the received absolute linear velocities of the position sensor and the received angular velocities of the mobile structure.

19. The method of claim 18, wherein the determining the estimated linear velocity of the mobile structure comprises:

determining a cross-correlation of the received angular velocities of the mobile structure and the received absolute linear velocities of the position sensor, and determining an amplitude scalar and a measurement delay corresponding to an angular velocity component of the received absolute linear velocities of the position sensor based on a first peak identified in the determined cross-correlation; or downsampling the received angular velocities of the mobile structure and the received absolute linear velocities of the position sensor to a preselected sample rate above a Nyquist frequency for an expected dominant frequency of the angular velocity component of the received absolute linear velocity of the position sensor, and determining the amplitude scalar and the measurement delay corresponding to the angular velocity component based on a spectral analysis of the downsampled angular velocities of the mobile structure and/or the downsampled absolute linear velocities of the position sensor; and determining the estimated linear velocity of the mobile structure by removing the angular velocity component from the received absolute linear velocities of the position sensor based, at least in part, on the determined amplitude scalar and measurement delay.

20. The method of claim 16, further comprising:

receiving absolute orientations of the mobile structure from the orientation sensor coupled to the mobile structure and spatial data from a spatial measurement sensor coupled to the mobile structure;

determining a set of relative orientations of a water plane represented within the spatial data corresponding to a set of measurement times, relative to a sensor orientation corresponding to the spatial measurement sensor;

identifying a set of absolute orientations of the mobile structure corresponding to the set of measurement times based, at least in part, on the received absolute orientations of the mobile structure; and determining a relative sensor orientation corresponding to the spatial measurement sensor, relative to the orientation sensor, based, at least in part, on the determined set of relative orientations of the water plane, the identified set of absolute orientations of the mobile structure, and a known absolute orientation of the water plane.

21. The method of claim 20, further comprising:

receiving absolute positions of the position sensor coupled to the mobile structure; and determining a relative sensor position corresponding to the spatial measurement sensor, relative to the position sensor, based, at least in part, on the determined relative sensor orientation corresponding to the spatial measurement sensor and the received absolute positions of the position sensor.

* * * * *

UNITED STATES PATENT AND TRADEMARK OFFICE
CERTIFICATE OF CORRECTION

| | | |
|---|---|---|
| PATENT NO. | : 11,280,896 B2 | Page 1 of 1 |
| APPLICATION NO. | : 16/412288 | |
| DATED | : March 22, 2022 | |
| INVENTOR(S) | : Hawker et al. | |

It is certified that error appears in the above-identified patent and that said Letters Patent is hereby corrected as shown below:

In the Specification

In Column 1, Line 64, change "patent application Ser. No." to --Patent Application No.--.

In Column 2, Lines 4-5, change "patent application Ser. No." to --Patent Application No.--.

In Column 2, Line 25, change "patent application Ser. No." to --Patent Application No.--.

In Column 2, Lines 26, change "patent application Ser. No." to --Patent Application No.--.

In Column 7, Line 42, change "Input data for" to --% Input data for--.

In Column 7, Line 44, change "Fix metadata for" to --% Fix metadata for--.

Signed and Sealed this
Second Day of August, 2022

Katherine Kelly Vidal
*Director of the United States Patent and Trademark Office*